United States Patent
Bell et al.

(10) Patent No.: US 7,168,035 B1
(45) Date of Patent: Jan. 23, 2007

(54) BUILDING A VIEW ON MARKUP LANGUAGE DATA THROUGH A SET OF COMPONENTS

(75) Inventors: Joshua S. Bell, Kirkland, WA (US); Alessandro Catorcini, Redmond, WA (US); Andrew Paul Begun, Redmond, WA (US); Jean D. Paoli, Kirkland, WA (US); Jun Jin, Bellevue, WA (US); Laurent Mollicone, Kirkland, WA (US); Willson Kulandai Raj, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 458 days.

(21) Appl. No.: 10/459,179

(22) Filed: Jun. 11, 2003

(51) Int. Cl.
*G06F 17/00* (2006.01)

(52) U.S. Cl. ............. 715/513; 715/505; 715/506; 715/745; 715/789

(58) Field of Classification Search .......... 715/513, 715/505, 506, 507, 789, 807; 717/513
See application file for complete search history.

(56) References Cited

U.S. PATENT DOCUMENTS

| | | | |
|---|---|---|---|
| 4,514,800 A | 4/1985 | Gruner et al. |
| 4,641,274 A | 2/1987 | Swank |
| 4,674,040 A | 6/1987 | Barker et al. |
| 4,723,211 A | 2/1988 | Barker et al. |
| 4,739,477 A | 4/1988 | Barker et al. |
| 4,815,029 A | 3/1989 | Barker et al. |
| 4,847,749 A | 7/1989 | Collins et al. |
| 4,910,663 A | 3/1990 | Bailey |
| 4,933,880 A | 6/1990 | Borgendale et al. |
| 4,962,475 A | 10/1990 | Hernandez et al. |
| 5,072,412 A | 12/1991 | Henderson, Jr. et al. |
| 5,179,703 A | 1/1993 | Evans |
| 5,182,709 A | 1/1993 | Makus |
| 5,187,786 A | 2/1993 | Densmore et al. |
| 5,191,645 A | 3/1993 | Carlucci et al. |
| 5,195,183 A | 3/1993 | Miller et al. |
| 5,204,947 A | 4/1993 | Bernstein et al. |
| 5,206,951 A | 4/1993 | Khoyi et al. |
| 5,218,672 A | 6/1993 | Morgan et al. |
| 5,237,680 A | 8/1993 | Adams et al. |
| 5,249,275 A | 9/1993 | Srivastava et al. |

(Continued)

FOREIGN PATENT DOCUMENTS

EP    0 841 615 A2    5/1998

(Continued)

OTHER PUBLICATIONS

Altova, "XML Spy, XML Integrated Development Environments," Altova, Inc., 2002, pp. 1-18.*

(Continued)

*Primary Examiner*—Heather R. Herndon
*Assistant Examiner*—Michael K. Botts
(74) *Attorney, Agent, or Firm*—Lee & Hayes, PLLC

(57) ABSTRACT

A designer uses a forms designer application to build electronic forms from hierarchical data. Displays of hierarchical data, facilitation of selection of a portion of the hierarchical data, and displays of one or more suggested transformation-language components associated with a selected portion of hierarchical data are described. From the transformation-language components selected by a designer, generation of an electronic form is also described.

6 Claims, 23 Drawing Sheets

U.S. PATENT DOCUMENTS

| | | |
|---|---|---|
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,688 A | 4/1995 | Williams et al. |
| 5,412,772 A | 5/1995 | Monson |
| 5,434,975 A | 7/1995 | Allen |
| 5,436,637 A | 7/1995 | Gayraud et al. |
| 5,440,744 A | 8/1995 | Jacobson et al. |
| 5,446,842 A | 8/1995 | Schaeffer et al. |
| 5,459,865 A | 10/1995 | Heninger et al. |
| 5,481,722 A | 1/1996 | Skinner |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,602,996 A | 2/1997 | Powers, III et al. |
| 5,608,720 A | 3/1997 | Biegel et al. |
| 5,627,979 A | 5/1997 | Chang et al. |
| 5,630,126 A | 5/1997 | Redpath |
| 5,634,121 A | 5/1997 | Tracz et al. |
| 5,640,544 A | 6/1997 | Onodera et al. |
| 5,659,729 A | 8/1997 | Nielsen |
| 5,664,178 A | 9/1997 | Sinofsky |
| 5,669,005 A | 9/1997 | Curbow et al. |
| 5,682,536 A | 10/1997 | Atkinson et al. |
| 5,689,703 A | 11/1997 | Atkinson et al. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,784,555 A | 7/1998 | Stone |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,854,630 A | 12/1998 | Nielsen |
| 5,859,973 A | 1/1999 | Carpenter et al. |
| 5,862,372 A * | 1/1999 | Morris et al. ............... 717/109 |
| 5,864,819 A | 1/1999 | De Armas et al. |
| 5,907,704 A | 5/1999 | Gudmundson et al. |
| 5,911,776 A | 6/1999 | Guck |
| 5,915,112 A | 6/1999 | Boutcher |
| 5,922,072 A | 7/1999 | Hutchinson et al. |
| 5,929,858 A | 7/1999 | Shibata et al. |
| 5,940,075 A | 8/1999 | Mutschler, III et al. |
| 5,950,010 A | 9/1999 | Hesse et al. |
| 5,956,481 A | 9/1999 | Walsh et al. |
| 5,960,199 A | 9/1999 | Brodsky et al. |
| 5,963,964 A | 10/1999 | Nielsen |
| 5,982,370 A | 11/1999 | Kamper |
| 5,987,480 A | 11/1999 | Donohue et al. |
| 5,991,710 A | 11/1999 | Papineni et al. |
| 5,995,103 A | 11/1999 | Ashe |
| 5,999,740 A | 12/1999 | Rowley |
| 6,014,135 A | 1/2000 | Fernandes |
| 6,016,520 A | 1/2000 | Facq et al. |
| 6,018,743 A | 1/2000 | Xu |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,044,205 A | 3/2000 | Reed et al. |
| 6,052,710 A | 4/2000 | Saliba et al. |
| 6,054,987 A | 4/2000 | Richardson |
| 6,072,870 A | 6/2000 | Nguyen et al. |
| 6,078,326 A | 6/2000 | Kilmer et al. |
| 6,078,327 A | 6/2000 | Liman et al. |
| 6,081,610 A | 6/2000 | Dwork et al. |
| 6,084,585 A | 7/2000 | Kraft et al. |
| 6,088,708 A | 7/2000 | Burch et al. |
| 6,091,417 A | 7/2000 | Lefkowitz |
| 6,094,657 A | 7/2000 | Hailpern et al. |
| 6,097,382 A | 8/2000 | Rosen et al. |
| 6,098,081 A | 8/2000 | Heidorn et al. |
| 6,108,637 A | 8/2000 | Blumenau |
| 6,108,783 A | 8/2000 | Krawczyk et al. |
| 6,122,647 A | 9/2000 | Horowitz et al. |
| 6,144,969 A | 11/2000 | Inokuchi et al. |
| 6,151,624 A | 11/2000 | Teare et al. |
| 6,154,128 A | 11/2000 | Wookey et al. |
| 6,163,772 A | 12/2000 | Kramer et al. |
| 6,167,521 A | 12/2000 | Smith et al. |
| 6,192,367 B1 | 2/2001 | Hawley et al. |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,698 B1 | 4/2001 | Iannucci et al. |
| 6,225,996 B1 | 5/2001 | Gibb et al. |
| 6,235,027 B1 | 5/2001 | Herzon |
| 6,253,366 B1 | 6/2001 | Mutschler, III |
| 6,253,374 B1 | 6/2001 | Dresevic et al. |
| 6,263,313 B1 | 7/2001 | Milsted et al. |
| 6,266,810 B1 | 7/2001 | Tanaka et al. |
| 6,275,227 B1 | 8/2001 | DeStefano |
| 6,275,599 B1 | 8/2001 | Adler et al. |
| 6,281,896 B1 | 8/2001 | Alimpich et al. |
| 6,282,711 B1 | 8/2001 | Halpern et al. |
| 6,286,033 B1 | 9/2001 | Kishinsky et al. |
| 6,292,897 B1 | 9/2001 | Gennaro et al. |
| 6,297,819 B1 | 10/2001 | Furst |
| 6,308,179 B1 | 10/2001 | Petersen et al. |
| 6,311,271 B1 | 10/2001 | Gennaro et al. |
| 6,321,334 B1 | 11/2001 | Jerger et al. |
| 6,327,628 B1 | 12/2001 | Anuff et al. |

| Patent | Date | Inventor |
|---|---|---|
| 6,342,907 B1 | 1/2002 | Petty et al. |
| 6,343,302 B1 | 1/2002 | Graham |
| 6,345,256 B1 | 2/2002 | Milsted et al. |
| 6,345,361 B1 | 2/2002 | Jerger et al. |
| 6,347,323 B1 | 2/2002 | Garber et al. |
| 6,349,408 B1 | 2/2002 | Smith |
| 6,353,926 B1 | 3/2002 | Parthesarathy et al. |
| 6,356,906 B1 | 3/2002 | Lippert et al. |
| 6,357,038 B1 | 3/2002 | Scouten |
| 6,366,907 B1 | 4/2002 | Fanning et al. |
| 6,366,912 B1 | 4/2002 | Wallent et al. |
| 6,369,840 B1 | 4/2002 | Barnett et al. |
| 6,369,841 B1 | 4/2002 | Salomon et al. |
| 6,374,402 B1 | 4/2002 | Schmeidler et al. |
| 6,381,742 B1 | 4/2002 | Forbes et al. |
| 6,381,743 B1 | 4/2002 | Mutschler, III |
| 6,389,434 B1 | 5/2002 | Rivette et al. |
| 6,393,456 B1 | 5/2002 | Ambler et al. |
| 6,396,488 B1 | 5/2002 | Simmons et al. |
| 6,408,311 B1 | 6/2002 | Baisley et al. |
| 6,421,070 B1 | 7/2002 | Ramos et al. |
| 6,421,656 B1 | 7/2002 | Cheng et al. |
| 6,425,125 B1 | 7/2002 | Fries et al. |
| 6,434,563 B1 | 8/2002 | Pasquali et al. |
| 6,434,564 B1 | 8/2002 | Ebert |
| 6,442,755 B1 | 8/2002 | Lemmons et al. |
| 6,446,110 B1 | 9/2002 | Lection et al. |
| 6,449,617 B1 | 9/2002 | Quinn et al. |
| 6,460,058 B1 | 10/2002 | Koppolu et al. |
| 6,470,349 B1 | 10/2002 | Heninger et al. |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,477,544 B1 | 11/2002 | Bolosky et al. |
| 6,480,860 B1 | 11/2002 | Monday |
| 6,487,566 B1 | 11/2002 | Sundaresan |
| 6,493,702 B1 | 12/2002 | Adar et al. |
| 6,502,101 B1 | 12/2002 | Verprauskus et al. |
| 6,502,103 B1 | 12/2002 | Frey et al. |
| 6,505,230 B1 | 1/2003 | Mohan et al. |
| 6,505,300 B1 | 1/2003 | Chan et al. |
| 6,507,856 B1 | 1/2003 | Chen et al. |
| 6,516,322 B1 | 2/2003 | Meredith |
| 6,519,617 B1 | 2/2003 | Wanderski et al. |
| RE38,070 E | 4/2003 | Spies et al. |
| 6,546,546 B1 | 4/2003 | Van Doorn |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,560,620 B1 | 5/2003 | Ching |
| 6,560,640 B1 | 5/2003 | Smethers |
| 6,563,514 B1 | 5/2003 | Samar |
| 6,578,144 B1 | 6/2003 | Gennaro et al. |
| 6,581,061 B1 | 6/2003 | Graham |
| 6,584,548 B1 | 6/2003 | Bourne et al. |
| 6,585,778 B1 | 7/2003 | Hind et al. |
| 6,598,219 B1 * | 7/2003 | Lau .................. 717/108 |
| 6,604,099 B1 | 8/2003 | Chung et al. |
| 6,606,606 B1 | 8/2003 | Starr |
| 6,609,200 B1 | 8/2003 | Anderson et al. |
| 6,611,822 B1 | 8/2003 | Beams et al. |
| 6,611,840 B1 | 8/2003 | Baer et al. |
| 6,613,098 B1 | 9/2003 | Sorge et al. |
| 6,615,276 B1 | 9/2003 | Mastrianni et al. |
| 6,629,109 B1 | 9/2003 | Koshisaka |
| 6,631,357 B1 | 10/2003 | Perkowski |
| 6,631,379 B1 | 10/2003 | Cox |
| 6,631,497 B1 | 10/2003 | Jamshidi et al. |
| 6,631,519 B1 | 10/2003 | Nicholson et al. |
| 6,635,089 B1 | 10/2003 | Burkett et al. |
| 6,636,845 B1 | 10/2003 | Chau et al. |
| 6,643,633 B1 | 11/2003 | Chau et al. |
| 6,643,684 B1 | 11/2003 | Malkin et al. |
| 6,654,737 B1 | 11/2003 | Nunez |
| 6,658,417 B1 | 12/2003 | Stakutis et al. |
| 6,668,369 B1 | 12/2003 | Krebs et al. |
| 6,678,717 B1 | 1/2004 | Schneider |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,711,679 B1 | 3/2004 | Guski et al. |
| 6,735,721 B1 | 5/2004 | Morrow et al. |
| 6,748,385 B1 | 6/2004 | Rodkin et al. |
| 6,751,777 B1 | 6/2004 | Bates et al. |
| 6,760,723 B1 | 7/2004 | Oshinsky et al. |
| 6,772,139 B1 | 8/2004 | Smith, III |
| 6,772,165 B1 | 8/2004 | O'Carroll |
| 6,774,926 B1 | 8/2004 | Ellis et al. |
| 6,779,154 B1 | 8/2004 | Nussbaum et al. |
| 6,816,849 B1 | 11/2004 | Halt, Jr. |
| 6,845,380 B1 | 1/2005 | Su et al. |
| 6,845,499 B1 * | 1/2005 | Srivastava et al. .......... 717/100 |
| 6,848,078 B1 | 1/2005 | Birsan et al. |
| 6,871,220 B1 | 3/2005 | Rajan et al. |
| 6,874,130 B1 | 3/2005 | Baweja et al. |
| 6,876,996 B1 | 4/2005 | Czajkowski et al. |
| 6,901,403 B1 | 5/2005 | Bata et al. |
| 6,931,532 B1 | 8/2005 | Davis et al. |
| 8,948,133 | 9/2005 | Haley |
| 6,963,875 B1 | 11/2005 | Moore |
| 6,968,505 B1 | 11/2005 | Stoll et al. |
| 6,996,781 B1 | 2/2006 | Myers et al. |
| 7,003,722 B1 | 2/2006 | Rothchiller et al. |
| 2001/0022592 A1 | 9/2001 | Alimpich et al. |
| 2001/0024195 A1 | 9/2001 | Hayakawa |
| 2001/0037345 A1 | 11/2001 | Kiernan |
| 2001/0056429 A1 | 12/2001 | Moore et al. |
| 2001/0056460 A1 | 12/2001 | Sahota et al. |
| 2002/0026441 A1 | 2/2002 | Kutay |
| 2002/0026461 A1 | 2/2002 | Kutay et al. |
| 2002/0032768 A1 | 3/2002 | Voskuil |
| 2002/0040469 A1 | 4/2002 | Pramberger |
| 2002/0057297 A1 | 5/2002 | Grimes et al. |
| 2002/0100027 A1 | 7/2002 | Binding et al. |
| 2002/0112224 A1 | 8/2002 | Cox |
| 2002/0133484 A1 | 9/2002 | Chau et al. |
| 2002/0152244 A1 | 10/2002 | Dean et al. |
| 2002/0156772 A1 | 10/2002 | Chau et al. |
| 2002/0156929 A1 | 10/2002 | Hekmatpour |
| 2002/0169789 A1 | 11/2002 | Kutay |
| 2002/0174147 A1 | 11/2002 | Wang et al. |
| 2002/0184219 A1 | 12/2002 | Presig et al. |
| 2002/0188613 A1 | 12/2002 | Chakraborty et al. |
| 2002/0196288 A1 | 12/2002 | Emrani |
| 2002/0198891 A1 | 12/2002 | Li et al. |
| 2002/0198935 A1 | 12/2002 | Crandall, Sr. et al. |
| 2003/0007000 A1 | 1/2003 | Carlson et al. |
| 2003/0014397 A1 | 1/2003 | Chau et al. |
| 2003/0025732 A1 | 2/2003 | Prichard |
| 2003/0037303 A1 | 2/2003 | Bodlaender |
| 2003/0043986 A1 | 3/2003 | Creamer |
| 2003/0046665 A1 | 3/2003 | Ilin |
| 2003/0051243 A1 | 3/2003 | Lemmons et al. |
| 2003/0056198 A1 | 3/2003 | Al-Azzawe |
| 2003/0061386 A1 | 3/2003 | Brown |
| 2003/0120659 A1 | 6/2003 | Sridhar |
| 2003/0120671 A1 | 6/2003 | Hong et al. |
| 2003/0120686 A1 | 6/2003 | Kim et al. |
| 2003/0140132 A1 | 7/2003 | Champagne et al. |
| 2003/0158897 A1 | 8/2003 | Ben-Natan et al. |
| 2003/0167277 A1 | 9/2003 | Hejlsberg et al. |
| 2003/0182268 A1 | 9/2003 | Lal |
| 2003/0187930 A1 | 10/2003 | Ghaffar et al. |
| 2003/0189593 A1 | 10/2003 | Yarvin |

| | | | |
|---|---|---|---|
| 2003/0204511 A1 | 10/2003 | Brundadge | |
| 2003/0204814 A1 | 10/2003 | Elo et al. | |
| 2003/0205615 A1 | 11/2003 | Marappan | |
| 2003/0225768 A1 | 12/2003 | Chaudhuri | |
| 2003/0225829 A1 | 12/2003 | Pena et al. | |
| 2003/0226111 A1 | 12/2003 | Wirts et al. | |
| 2003/0226132 A1 | 12/2003 | Tondreau et al. | |
| 2003/0237046 A1* | 12/2003 | Parker et al. | 715/513 |
| 2003/0237047 A1 | 12/2003 | Borson | |
| 2004/0002939 A1 | 1/2004 | Arora | |
| 2004/0073565 A1 | 4/2004 | Kaufman et al. | |
| 2004/0117769 A1 | 6/2004 | Lauzon et al. | |
| 2004/0146199 A1 | 7/2004 | Berkner et al. | |
| 2004/0186762 A1 | 9/2004 | Beaven et al. | |
| 2004/0205473 A1 | 10/2004 | Fisher et al. | |
| 2004/0205571 A1 | 10/2004 | Adler | |
| 2004/0205605 A1 | 10/2004 | Adler et al. | |
| 2004/0221245 A1 | 11/2004 | Chickles et al. | |
| 2005/0027757 A1 | 2/2005 | Kiessig et al. | |
| 2005/0102370 A1 | 5/2005 | Yun et al. | |
| 2005/0171746 A1 | 8/2005 | Thalhammer-Reyero | |
| 2005/0198086 A1 | 9/2005 | Moore | |
| 2005/0223320 A1 | 10/2005 | Brintzenhofe et al. | |
| 2005/0240876 A1 | 10/2005 | Myers et al. | |
| 2006/0020586 A1 | 1/2006 | Prompt et al. | |
| 2006/0031757 A9 | 2/2006 | Vincent, III | |
| 2006/0036995 A1 | 2/2006 | Chickles et al. | |
| 2006/0041838 A1 | 2/2006 | Khan | |
| 2006/0085409 A1 | 4/2006 | Rys et al. | |

FOREIGN PATENT DOCUMENTS

| | | |
|---|---|---|
| EP | 0 961 197 | 12/1999 |
| EP | 1 076 290 A2 | 2/2001 |
| JP | 63085960 | 4/1988 |
| JP | 401173140 A | 7/1989 |
| JP | 3191429 | 8/1991 |
| JP | 4225466 | 8/1992 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 2000132436 | 5/2000 |
| JP | 2002183652 | 6/2002 |
| JP | 2003173288 | 6/2003 |
| WO | WO 99/24945 | 5/1999 |
| WO | WO 99/56207 | 11/1999 |
| WO | WO 01/44934 A1 | 6/2001 |

OTHER PUBLICATIONS

Ixia Soft, "Streamlining content creation, retrieval, and publishing on the Web using TEXTML Server and SML Spy 4 Suite in an integrated, Web publishing environment," (Partner's Whitepaper, published on the Web as of Jun. 6, 2002, downloaded pp. 1-16.*
Altova, "User Reference Manual Version 4.4, XML Spy Suite 4.4," Altova Ges.m.b.H & Altova, Inc., May 24, 2002, pages cover, copyright page, 1-565.*
Altova, "User Reference Manual Version 4.4, XML Spy Suite 4.4," Altova Ges.m.b.H & Altova, Inc., May 24, 2002.*
Altova, "XML Spy, XML Integrated Development Environments," Altova, Inc., published on the internet as of Aug. 21, 2002, downloaded from: web.archive.org/web/20020802160010/www.xmlspy.com/resources_wp.html.*
Clarke, P., "From small beginnings," Knowledge Management, Nov. 2001, pp. 28-30.
Description of Whitehill Composer software product, produced by Whitehill Technologies, Inc., available at <http://www.xml.com/pub/p/221>, accessed on Apr. 8, 2004, two pages.
Sun, Q., et al., "A Robust and Secure Media Signature Scheme for JPEG Images," Proceedings of 2002 IEEE Workshop on Multimedia Signal Processing, Dec. 2002, pp. 296-299.

Komatsu, N., et al., "A Proposal on Digital Watermark in Document Image Communication and Its Application to Realizing a Signature," Electronics and Communications in Japan, Part I: Communications, vol. 73, No. 5, May 1990, pp. 22-33.
Noore, A., "A Secure Conditional Access System using Digital Signature and Encryption," International Conference on Consumer Electronics, Jun. 2003, pp. 220-221.
Pacheco, X., et al., "Delphi 5 Developer's Guide," Sams Publishing 1999, Section: Data Streaming, 6 pages.
Clark, James, Ed.; "XSL Transformation (XSLT) Version 1.0", Nov. 16, 1999, W3C (MIT, INRIA, Keio), pp. 1-156.
Clark, James and Steve Derose, "XML Path Language (XPath) Version 1.0", Nov. 16, 1999, W3C (MIT, INRIA, Keio), pp. 1-49.
Musgrave, S., "Networking technology—impact and opportunities", Survey and Stastical Computing 1996. Proceedings of the Second ASC International Conference. Sep. 1996, pp. 369-378. London, UK.
Rapaport, L., "Get more from SharePoint", Transform Magazine, vol. 11, No. 3, Mar. 2002, pp. 13, 15.
McCright, J.S., "New Tool Kit to Link Groove with Microsoft SharePoint", eWeek, Enterprise News & Reviews, Ziff Davis Media Inc., Jul. 29, 2002, 1 page.
U.S. Appl. No. 60/209,713, filed Jun. 5, 2000.
U.S. Appl. No. 60/191,662, Kutay et al.
U.S. Appl. No. 60/203,081, Ben-Natan et al.
"Store and Organize Related Project Files in a Binder," Getting Results with Microsoft Office, 1990, pp. 109-112.
Barker et al., "Creating In-Line Objects Within An Integrated Editing Environment," IBM Technical Disclosure Bulletin, vol. 27, No. 5, Oct. 1984, p. 2962.
Berg A., "Naming and Binding: Monikers" Inside OLE, 1995, Chapter 9, pp. 431-490.
Clapp D., "The NeXT Application Kit Part I: Non-Responsive Classes," The NeXT Bible 1990, Chapter 16, pp. 275-293.
DiLascia et al., "Sweeper" Microsoft Interactive Developer, vol. 1, No. 1, 1996, 27 pages.
Herzner et al., "CDAM—Compound Document Access and Management. An Object-Oriented Approach" Multimedia Systems Interaction and Applications, 1992, Chapter 3, pp. 17-36.
Kobayashi et al., "An Update on BTRON-specification OS Development" IEEE 1991 pp. 132-140.
Peterson B., "Unix Variants," Unix Review, vol. 10, No. 4, Apr. 1992, pp. 29-31.
Pike et al., "Plan 9 from Bell Labs" UKUUG, Summer 1990, 10 pages.
Pike et al., "The Use of Name Spaced in Plan 9," Operating Systems Review vol. 27, No. 2, Apr. 1993, pp. 72-76.
Staneck W., "Internal and External Media" Electronic Publishing Unleased, 1995, Chapter 22, pp. 510-542.
Zdonik S., "Object Management System Concepts," ACM, 1984, pp. 13-19.
Trupin J., "The Visual Programmer," Microsoft Systems Journal, Apr. 1996, pp. 103-105.
Richard Scott Hall, "Agent-based Software Configuration and Deployment," Thesis of the University of Colorado, Online, Dec. 31, 1999, retrieved from the Internet on Nov. 7, 2003: <http://www.cs.colorado.edu/users/rickhall/documents/ThesisFinal.pdf>, 169 pages.
Arthur Van Hoff et al., "The Open Software Description Format," Online, Aug. 13, 1997, retrieved from the Internet on Nov. 7, 2003: <http://www.w3.org/TR/NOTE-OSD>, 11 pages.
Netscape Communications Corp., "SmartUpdate Developer's Guide," Online, Mar. 11, 1999, retrieved from the Internet on Dec. 8, 2000: <http://developer.netscape.com:80/docs/manuals/communicator/jarman/index.htm>, 83 pages.
Lindea Dayton and Jack Davis, "Photo Shop 5/5.5 WOW! Book," 2000, Peachpit Press, pp. 8-17.
Sara Williams and Charlie Kindel, "The Component Object Model: A Technical Overview," Oct. 1994, Microsoft Corp., pp. 1-14.
Varlamis et al., "Bridging XML-Schema and relational databases. A system for generating and manipulating relational databases using valid XML documents," DocEng '01, Nov. 9-10, 2001, Copyright 2001, ACM 1-58113-432-0/01/0011, pp. 105-114.

Hardy et al., "Mapping and Displaying Structural Transformations between XML and PDF," DocEng '02, Nov. 8-9, 2002, Copyright 2002, ACM 1-58113-594-7/02/0011, pp. 95-102.

Kim et al., "Immediate and Partial Validation Mechanism for the Conflict Resolution of Update Operations in XML Databases," WAIM 2002, LNCS 2419, 2002, pp. 387-396, Springer-Verlag Berlin Heidelberg 2002.

Chuang, T., "Generic Validation of Structural Content with Parametric Modules," ICFP '01, Sep. 3-5, 2001, Copyright 2001, ACM 1-58113-415-0/01/0009, pp. 98-109.

Chen et al., "Designing Valid XML Views," ER 2002, LNCS 2503, 2002, Springer-Verlag Berlin Heidelberg 2002, pp. 463-477.

Chen et al., "XKvalidator: A Constraint Validator for XML," CIKM '02, Nov. 4-9, 2002, Copyright 2002, ACM 1-58113-492-4/02/0011, pp. 446-452.

William Brogden, "Arbortext Adept 8 Editor Review," O'Reilly XML.COM, 'Online! Sep. 22, 1999) XP002230080,iretrieved from the Internet <URL:http://www.xml.com/pub/a/1999/09/adept/AdeptRvw.htm>, retrieved on Feb. 5, 2003.

Liora Alschuler, "A tour of XMetal" O'Reilly XML.COM, 'Online! Jul. 14, 1999, XP002230081, retrieved from the Internet: <URL:http://www.xml.com/pub/a/SeyboldReport/ip031102.html>, retrieved on Feb. 5, 2003.

Ari Davidow, "XML Editors: Allegations of Functionality in search of reality," INTERNET, 'Online! 1999, XP002230082, retrieved from the Internet, <URL:http://www.ivritype.com/xml/>.

Steven A. Battle, et al., "Flexible Information Presentation with XML", 1998, The Institution of Electrical Engineers, 6 pages.

Paolo Ciancarini, et al., "Managing Complex Documents Over the WWW: A Case Study for XML", IEEE Transactions on Knowledge and Data Engineering, vol. 11, No. 4, Jul./Aug. 1999, pp. 629-638.

Hirotaka Kanemoto, et al., "An Efficiently Updatable Index Scheme for Structured Documents", 1998 IEEE, pp. 991-996.

Tommie Usdin, et al., "XML: Not a Silver Bullet, But a Great Pipe Wrench", Standardview vol. 6, No. 3, Sep. 1998, pp. 125-132.

Supoj Sutanthavibul, et al., "XFIG Version 3.2 Patchlevel 2(Jul. 2, 1998) Users Manual (Edition 1.0)", Internet Document, [Online] Jul. 2, 1998, XP002229137 Retrieved from the Internet: <URL:http://www.ice.mtu.edu/online_docs/xfig332/22 [retrieved on Jan. 28, 2003].

"Architecture for a Dynamic Information Area Control", IBM Technical Disclosure Bulletin, IBM Corp. New York, US, vol. 37, No. 10, Jan. 10, 1994, pp. 245-246.

Irene Au & Shuang Li, "Netscape Communicator's Collapsible Toolbars," CHI '98, Human Factors in Computing Systems, Conference Proceedings, Los Angeles, CA, Apr. 18-23, 1998, pp. 81-86.

Netscape Communication Corporation: "Netscape Communicator 4.61 for OS/2 Warp" Software, 1999, The whole software release & "Netscape—Version 4.61 [en]—010615" Netscape Screenshot, Oct. 2, 2002.

Rogge et al., "Validating MPEG-21 Encapsulated Functional Metadata," IEEE 2002, pp. 209-212.

Nelson, "Validation with MSXML and XML Schema," Windows Developer Magazine, Jan. 2002, pp. 35-38.

Chien et al., "XML Document Versioning," SIGMOD Record, vol. 30, No. 3, Sep. 2001, pp. 46-53.

Wong et al., "Managing and Querying Multi-Version XML Data with Update Logging," DocEng '02, Nov. 8-9, 2002, Copyright 2002, ACM 1-58113-594-7/02/0011, pp. 74-81.

Chien et al., "Efficient schemes for managing multiversionXML documents", VLDB Journal (2002), pp. 332-353.

Chien et al., "Efficient Management of Multiversion Documents by Object Referencing," Proceedings of the 27th VLDB Conference, 2001, pp. 291-300.

Chien et al., "Storing and Querying Multiversion XML Documents using Durable Node Numbers," IEEE 2002, pp. 232-241.

Dyck, T., "XML Spy Tops as XML Editor," http://www.eweek.com/article2/0,3959,724041,00.asp, Nov. 25, 2002, 4 pages.

"Netscape window" Netscape Screenshot, Oct. 2, 2002.

Jan-Henrick Haukeland, "Tsbiff—tildeslash biff—version 1.2.1" Internet Document, [Online] Jun. 1999, URL:http://web.archive.org/web/19990912001527/http://www.tildeslash.com/tsbiff/.

Ben-Natan, U.S. Appl. No. 60/206,081, filed May 9, 2000, entitled "Internet platform for creating and supporting communities".

Kutay, U.S. Appl. No. 60/209,713, filed Jun. 5, 2000, entitled, " Methods and systems for accessing, organizing presenting and viewing data".

Microsoft Word 2000 (see Screen Shot "About Microsoft Word") Published 1983-1999 and Microsoft Excel 2000 (see Screen Shot "About Microsoft Excel") Published 1988-1999, Three pages.

Moore, U.S. Appl. No. 60/191,662, filed Mar. 23, 2000, entitled "Collection-based presistent digital archives".

OMG XML Metadata Interchange (XMI) Specification Version 1.2 Jan. 2002.

U.S. Appl. No. 60/209,713, filed Jan. 1, 2000, Kutay et al.

"An Efficient and Flexible Access Control Framework for Java Programs in Mobile Terminals"; 22nd International Conference on Distributed Computing Systems Workshops; 2002; pp. 777-782.

"Sandboxing Applications"; Proceedings of the FREENIX Track; 2001; pp. 119-126.

"Specifying Runtime Environments and Functionalities of Downloadable Components Under the Sandbox Mode"; International Symposium on Principles of Software Evolution; 2000; pp. 138-142.

Schmid, et al, "Protecting Data from Malicious Software"; 18th Annual Computer Security Applications Conference; 2002; pp. 199-208.

"Micro-Firewalls for Dynamic Network Security with Distributed Intrusion Detection"; IEEE INternational Symposium on Network Computing and Applications; 2001; pp. 68-79.

"Whitehill Composer" Whitehill Technologies Inc. 2 pages.

Laura Acklen & Read Gilgen, "Using Corel Wordperfect 9", 251-284, 424-434, 583-586 (1998).

Bruce Halberg et al, "Using Microsoft Excel 97", Published 1997, Bestseller Edition, Pertinent Pages: 1-9, 18-25, 85-89, 98-101, 106-113, 124-127, 144-147, 190-201, 209-210, 218-227, 581-590, 632-633, 650-655, 712-714.

LeBlond et al, "PC Magazine Guide to Quattro Pro for Windows", pp. 9-11, 42-61, Ziff-Davis Press, Copyright 1993 by the LeBlond Group.

Mansfield, "Excel 97 for Busy People", Published by Osborne/Mcgraw-Hill 1997 pp. 48-50.

"Microsoft Visual Basic 5.0 Programmer's Guide 1997"; pp. 578-579; Redmond WA 98052-6399.

Han et al., WebSplitter: A Unified XML Framework for Multi-Device Collaborative Web Browsing, 2000, ACM Conference on Cimputer Supported Cooperative Work, 10 pages.

IBM: Stack Algorithm for Extractin Subtree from Serialized Tree, Mar. 1, 1994, TDB-ACC-NONN94033, 3 pages.

Altova, Inc., "XML Spy 4.0 Manual," Altova Inc. & Altova GmbH, copyright 1998-2001, Chapters 1, 2, and 6, encompassing pp. 1-17, 18-90, and 343-362.

Cybook, INC.: "Copying the Search Form to Services-based Web Sites" INternet Article, (online) Jul. 26, 2004, *the whole document*.

Excel Developer Tip (hereinafter "Excel"), "Determining the Data Type of a Cell", May 13, 1998, p. 1 (available at http://jwalk.com/ss//excel/tips/tip62.htm).

Macromedia, INC.: "Dreamweaver Technote, Changes in copying and pasting in Dreamweaver 4" Internet Article (online). *the whole document*.

Rado, Dave: "How to create a template that makes it easy for users to "fill in the blanks", without doing any programming" Microsoft Word MVP FAQ Site, (online) Apr. 30, 2004, the whole document.

Cover, XML Forms Architecture, retrieved at <<http://xml.coverpages.org/xfa.html>> on Aug. 17, 2006, Coverpages, Jun. 16, 1999.

Raggett, "HTML Tables", retrieved on Aug. 6, 2006, at <<http:www://ie-edu.hcmuns.edu.vn/WebLib/books/Web/Tel/html3-tables.html>>, W3C Internet Draft, Jul. 7, 1995, pp. 1-12.

"Webopedia Computer Dictionary" retrieved on May 9, 2006, at <<http://www.pewebopedia.com/TERM/O/OLE.html>>, Jupitermiedia Corporation, 2006, pp. 07.

* cited by examiner

BUILDING A VIEW ON MARKUP LANGUAGE DATA THROUGH A SET OF COMPONENTS

TECHNICAL FIELD

This invention relates to designing electronic forms, and more particularly, to a user-friendly way to design electronic forms using a visual representation of hierarchical data, suggested data-entry fields representing selected portions of the hierarchical data, and a form-designing area of a user interface.

BACKGROUND

Extensible markup language (XML) is increasingly becoming the preferred format for transferring data. XML is a tag-based hierarchical language that is extremely rich in terms of the information that it can be used to represent. For example, XML can be used to represent information spanning the spectrum from semi-structured information (such as one would find in a word processing document) to generally structured information (such as that which is contained in a table). XML is well-suited for many types of communication including business-to-business and client-to-server communication. For more information on XML, XSLT, and XSD (schemas), the reader is referred to the following documents which are the work of, and available from the W3(World Wide Web consortium): XML Schema Part 2: Datatypes; XML Schema Part 1: Structures, and XSL Transformations (XSLT) Version 1.0; and XML 1.0 second edition specification.

With so much information being described and transferred through XML, it is increasingly important to have ways to view that information. One way to view information in an XML document is to transform it with an XSLT file into an HTML (or XHTML) document. HTML documents can be used to render, or view, information, such as information from an XML file. Using XSLT, rather than other transforming languages, is often preferred because XSLT is a W3C standard.

One purpose for using an XSLT file to transform an XML document is to create electronic forms. Electronic forms can be used not only to view information within an XML document, but also to allow a user of the electronic form to add, remove, or change information within the XML document by editing data in a data-entry field within the electronic form.

Currently, to create an HTML document (e.g., an electronic form) that renders information within an XML document, a programmer writes an XSLT file to transform the XML document into the HTML document. The programmer, however, must have a high degree of skill in programming XSLT to program an XSLT file, especially to create an electronic form.

Also, even with a high degree of programming skill, programming an XSLT file can be very time consuming and difficult. It can be difficult and time-consuming because an XSLT programmer cannot see the HTML document that he is creating as he is creating it. The programmer, rather, must complete an XSLT file and apply it to an XML file before he can see the view created with the resulting HTML document. Even with the view, each mistake made by the programmer, such as the style, layout, and structure of the view, can be very difficult to relate back to the mistake made in the XSLT file, further complicating programming of XSLT files to create HTML documents.

The data-entry fields in an electronic form can be quite diverse in nature, including fields into which are entered simple text, numeric fields, data fields, table with numerous row and column entries, dates, rich text, hyperlinks, and graphics. A programmer of significant skills is required to program an error-free XSLT file from which will be created an electronic form having data-entry fields for entry of diverse data types.

For these reasons, creating electronic forms and other HTML documents by transforming an XML document with an XSLT file is difficult, time consuming, and requires a high degree of skill.

SUMMARY

A description is provided to enable a designer to build an electronic form from hierarchical data. Displays of hierarchical data, facilitation of selection of a portion of the hierarchical data, and displays of one or more suggested transformation-language components that are compatible with the structure of the selected portion of hierarchical data are described. Generation of an electronic form from transformation-language components selected by a designer is also described.

BRIEF DESCRIPTION OF THE DRAWINGS

A more complete understanding of the implementations may be had by reference to the following detailed description when taken in conjunction with the accompanying drawings wherein.

DETAILED DESCRIPTION

The following disclosure describes a user-friendly way to design electronic forms using a visual representation of hierarchical data and a form-designing area of a display. Hierarchical data is presented in an area of a display screen, usually presented graphically, such as with an arrangement of icons. Icons represent some part of the hierarchical data and are generally a simplification of the data so that a designer can more easily understand the purpose of and choose from various parts of the hierarchical data. A designer can choose a part or portion of the hierarchical data that he or she wishes to include in an electronic form.

When the designer chooses part of the hierarchical data, such as by clicking on an icon representing part of the hierarchical data, one or more components representing a way to present that part of the hierarchical data are suggested to the designer. Upon a selection of a suggested component, the selected component can be placed on a form-designing area. The form-designing area is presented in an area of a display screen, usually appearing as a blank page, such as is often done when viewing a new document in a word-processing application. Components placed in a form-designing area can be manipulated by a designer to allow the designer to make an electronic form look and feel like the designer desires.

For discussion purposes, the visual representation of the data and the form-designing area are described in the context of a single computer, a set of user-input devices, and a single display screen having an area for displaying a representation of the data and another area for displaying the form-designing area. The display screen, computer, and user-input devices will be described first, followed by a discussion of the techniques in which these and other devices can be used.

The Display Screen, Computer, and User-Input Devices

Figure 1:
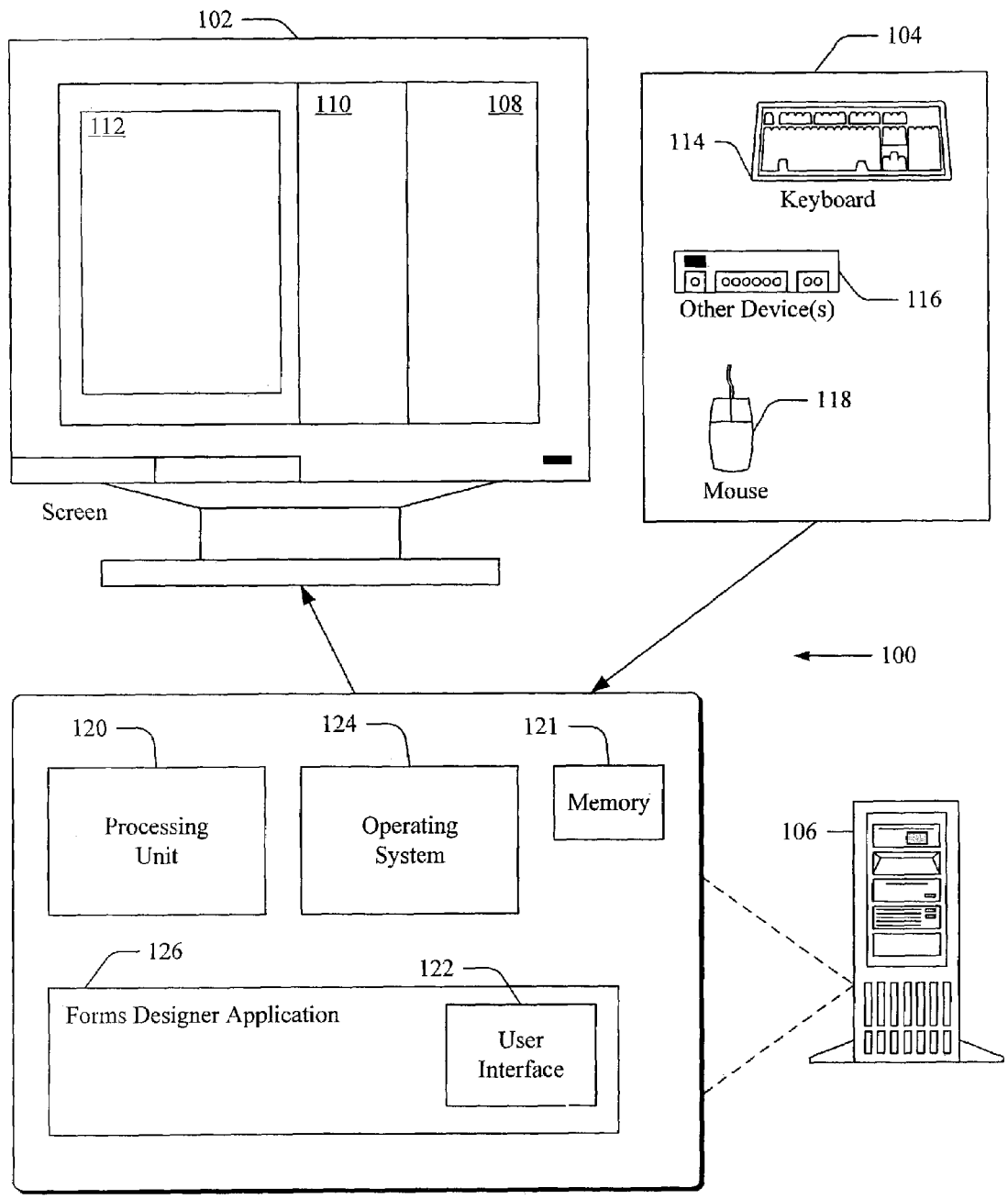
FIG. 1 illustrates an exemplary system with a display screen, computer, and user-input devices. The system implements a method for designing electronic forms.

FIG. 1 shows an exemplary system 100 that facilitates creation of electronic forms from a representation of data. The system 100 includes a monitor or screen 102, one or more user-input devices 104, and a computer 106. The user-input devices 104 can include any device allowing a computer to receive a designer's preferences, such as a keyboard 114, other device(s) 116 (e.g., a touch screen, a voice-activated input device, a track ball, etc.), and a mouse 118. The computer 106 includes a processing unit 120 and memory 121, which includes both volatile and non-volatile memory.

An operating system 124 and one or more applications are stored in memory and execute on the processing unit 120. One particular application is a forms designer application 126, which allows a designer to create electronic forms with little or no programming skill. The forms designer application 126 provides a visual what-you-see-is-what-you-get (WYSIWYG) user interface 122 that enables designers to visually construct an electronic form by visually selecting structured data items and arranging them into a form in a manner that is intuitive and straight forward. As the designer builds the form through the user interface, the application 126 enforces the underlying schemas to ensure that the form complies with the intended structure.

The user interface 122 includes three areas depicted on the screen 102: a data display area 108, a component display area 110, and a form-design area 112. The three areas may be shown individually, or in groups of two areas, as desired. The areas 108, 110, and 112 may be implemented as individual graphical windows, such as those supported by Microsoft's Windows® operating system. Alternatively, the areas may be panes within a common window, or some other graphical arrangement.

Data display area 108 shows a representation of a data source of hierarchical data. The data may be presented and structured in a number of ways. In one example, the data display area 108 depicts hierarchical data arranged into a tree structure having multiple nodes. From this data display area 108, a designer can select various parts of the hierarchical data to be represented in the form-design area 112 when constructing an electronic form. When the designer selects a certain portion of data in data display area 108, the forms designer application 126 presents a list of suggested components in the component display area 110 that can be used in the form-design area 112 to represent the selected portion of hierarchical data. The number and type of suggested components in the component display area 110 varies depending upon the hierarchical data that is selected and a predetermined criteria upon which the suggestions are made.

The designer can then choose one or more of the suggested components in the component display area 110 and arrange them in a representation of a form being constructed in the form-design area 112. For instance, the designer can drag and drop a suggested component from the component display area 110 (which corresponds to a selected portion of hierarchical data (e.g., a node in the data tree) from the display area 108) onto the form-design area 112, and the underlying forms designer application 126 will show how the selected component will affect the electronic form produced.

Figure 2:
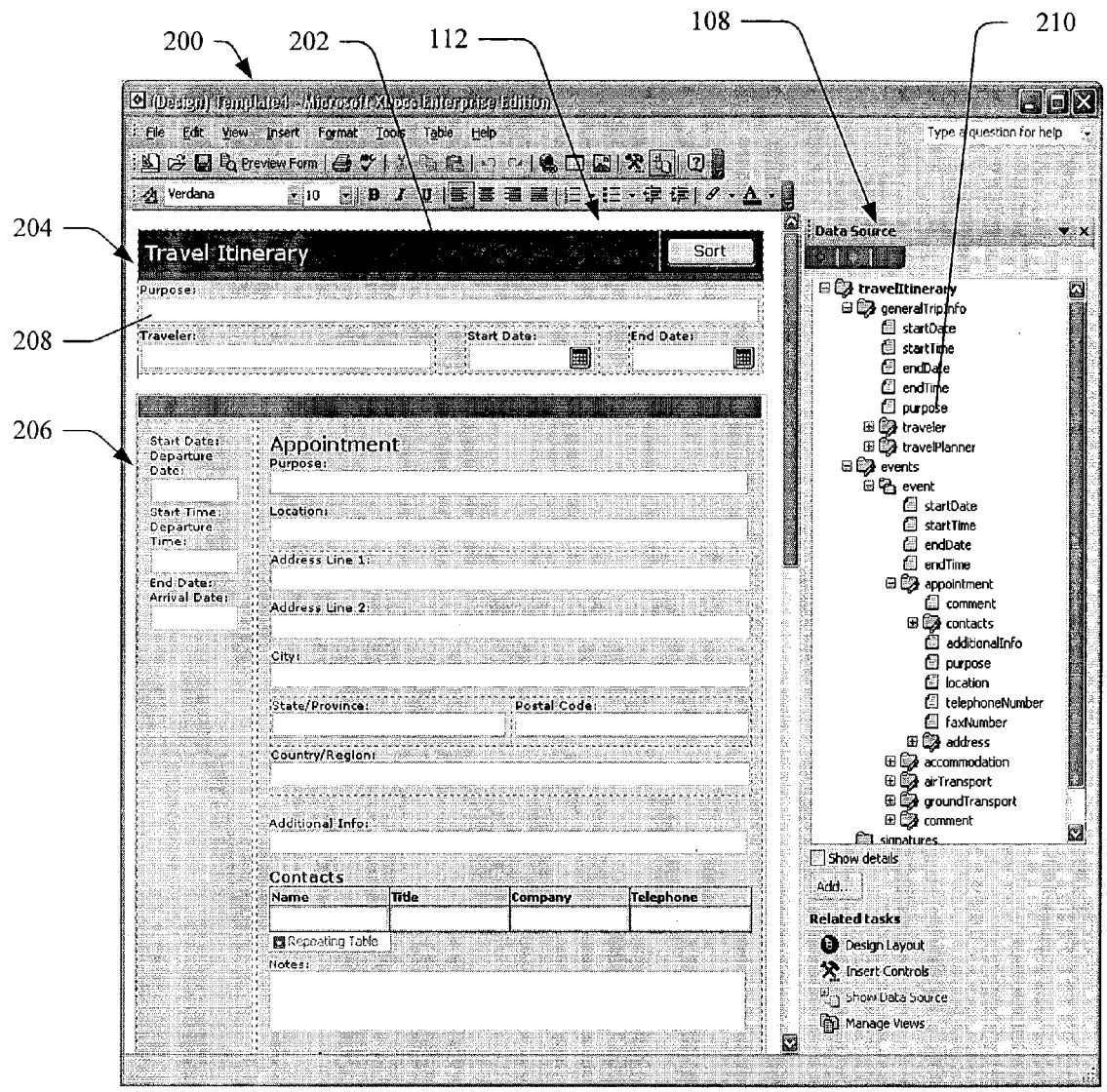
FIG. 2 illustrates an exemplary screen display showing a data display area and a form-design area.

FIG. 2 shows an example screen display 200 illustrating construction of an electronic form in the form-design area 112 by selection of hierarchical data elements in the data display area 108. In this example, a representation 202 mimics an electronic form being constructed for a fictitious travel itinerary. It has a top section 204 that describes general trip information, having components that represent data-entry fields in the electronic form, which will allow entry of the purpose of the trip, the traveler's name, and the start and end dates. The representation 202 also has a bottom section 206 for tracking individual appointments made on the trip. In this example, the appointment section 206 will allow such entries as the purpose of the appointment, its location, and the people contacted during the appointment.

The representation 202 follows the file of hierarchical data provided in data display area 108. In this example, the hierarchical data file is arranged into a tree structure, which includes a node named "generalTripInfo" that generally corresponds to the top portion 204 of the form, and hierarchical nodes named "event" and "appointment" that generally correspond to the bottom portion 206.

The representation 202 (and, eventually, the electronic form it mimics) can be constructed by selecting nodes in the data tree structure in display area 108 and arranging representative components onto the form-design area 112. For example, to create the "Purpose" entry field representation 208 in the top section 204, the designer selects the purpose node 210 in the data display area 108. The forms designer application 126 determines and then presents a list of suggested components (not shown in FIG. 2) corresponding to the purpose node 210. The designer then chooses one of the suggested components and identifies a corresponding location in the form-design area 112 for the selected component to be placed.

One technique for the selection and placement of a suggested component is to drag-and-drop the selected component corresponding to the node 210 onto the desired location, and the forms designer application 126 will show a representation of how an operable field corresponding to the component will appear in the electronic form. Here the suggested components are ranked by predetermined criteria. The component that has the highest priority rank will be represented as the operable field. As such, no user selection of a suggested component is required.

The process used to build an electronic form from components associated with hierarchical data will be set forth in greater detail below. The above devices and applications are merely representative, and other known devices and applications may be substituted for or added to those shown in FIG. 1. One example of another known device that can be substituted for those shown in FIG. 1 is the device shown in FIG. 30.

Figure 3:
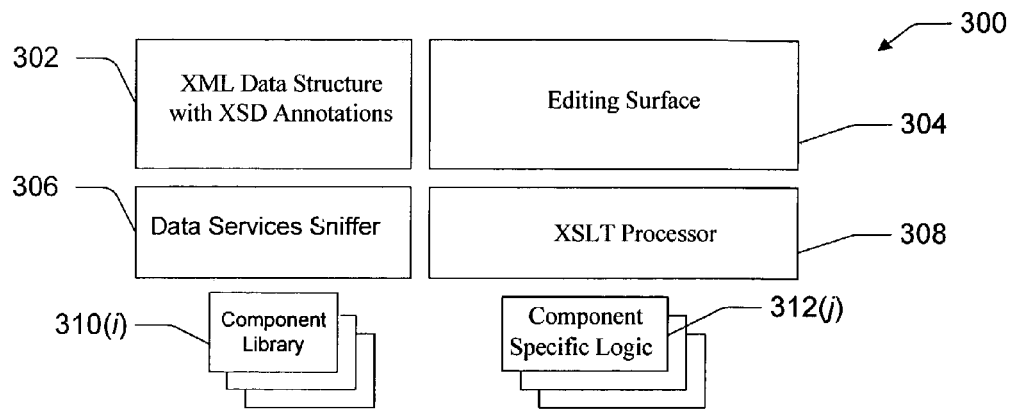
FIG. 3 is a block diagram showing exemplary components for implementations of the invention.
Figure 4:
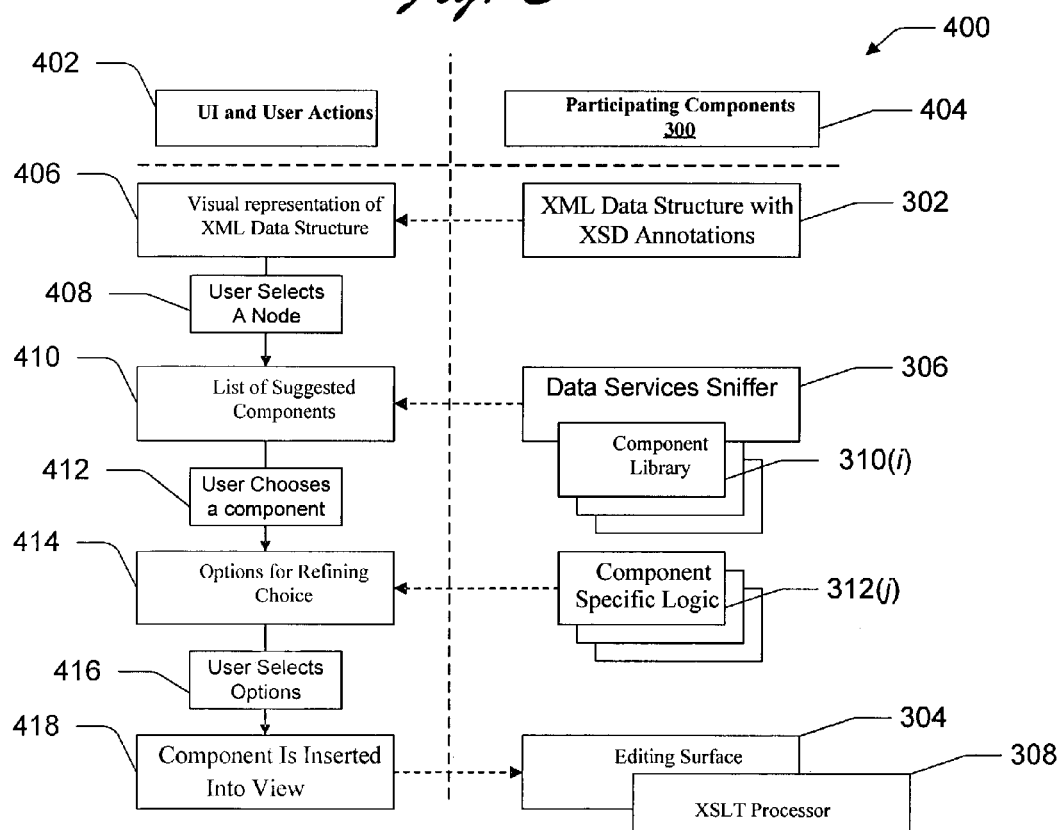
FIG. 4 is a flow chart depicting an implementation of a method for selecting a field to be visually represented upon an editing surface of a user interface by use of the exemplary components depicted in FIG. 3.

An example of a method 400 is depicted in FIG. 4 that uses various components shown in FIG. 3. Method 400 is bifurcated into two (2) sections, 402 and 404, which respectively depict actions by a user of a user interface and participating components 300 shown in FIG. 3 for method 400.

In block 406 of method 400, an XML data structure is presented on a user interface to a user. The XML data structure is visually presented as a hierarchical arrangement of nodes in a tree structure. Each node can be hierarchically above or below one or more nodes. The XML data structure can be associated with annotations for an XML Schema (or "XSD"). This association is seen in FIGS. 3–4 as XML Data Structure with XSD annotations 302. These annotations can be used to relax the otherwise strict validation standards of the XSD that are used to test XML instances. The XSD annotations can add options to the constraints of the XSD for the XML data structure.

In order to visually present the tree structure, the tree structure must be created or discovered. The tree structure can be created by a user inputting the hierarchical structure of the nodes in the tree structure. The tree structure can be discovered by obtaining its specification from an XML specific standards body (e.g. Chemical XML (CML), Math XML (MATHML), meat industry XML (MEATML), etc.). Alternatively, the tree structure can be discovered by connecting to an online database that stores tree structures. Web services can also be used to discover the tree structure. In the case of web services, a client can send an XML request for information to a web site that responds to the request with a tree structure for XML data and with an XML answer to the XML request. When the XML request is made to the web site, the XML request also discovers the web site's web services. For this to happen, the web site can answer back by telling the requestor that web services can be provided by the web site. The web site also gives back an XSD schema with the XML answer to the XML request initially submitted by the requesting client. Additional information regarding web services can be obtained from the World Wide Web Consortium (W3C.)

If an XML file was built by input without an XSD, then the XML file can be opened by implementations of the present invention. The opening of the XML file can be used to infer a tree structure or a schema for the XML file.

At block 408 of method 400, the user selects a node on the tree structure via input made to the user interface. The input can be made by conventional input techniques, including but not limited to clicking on the node with a mouse. Additional input after clicking on the node can be made by dragging the node onto an editing surface 304 of the user interface and then dropping the node onto the editing surface 304. In one implementation, a user's selection of one or more nodes within the tree structure corresponds to an XPath which may be resolved against the corresponding XML data. Selecting any node within the tree corresponds to specifying an XPath. An XPath can specify one or more nodes within the tree structure. The XPATH identifies a fragment of the XML document (e.g. one or more nodes). The XPath is thus a mechanism by which the XML data from the XML document can be selected for which a visual representation thereof is to be made.

After the user selects a node by input at block 408, control in method 400 moves to block 410 where one or more suggested data structures (e.g. components) of the node are determined. The components are determined by a data services sniffer 306. The data services sniffer 306 performs a validation and/or comparison routine. This routine examines the XSD for the node, with or without relaxed validation annotations that are part of the component XML Data Structure with XSD annotations 302. A shape description language (SDL) can be used to describe fields that are to be placed on the editing surface of the user interface.

An instance of an XSD schema can be an instance of an SDL component that matches a possible instance exactly. For example, an XSD schema fragment which validates a node named "firstName" of type "integer" is also an SDL shape which matches a node named "firstName" of type "integer". The SDL allows for a relaxation of XSD validation restrictions by inserting annotation attributes into the XSD syntax within the SDL namespace. An exemplary table of such annotations that can be inserted into the XSD syntax within the SDL namespace is seen in TABLE 1.

TABLE 1

| Attribute | Allowed in these XSD elements | Notes |
| --- | --- | --- |
| anyName | <element>; <attribute>; <complexType>; <complexContent>; <enumeration> | Relaxes the match of the name attribute to any valid name. |
| allowAsAttribute | <element> | The match would trigger for the present item being either an element or an attribute in this position in the tree |
| Type | <any> | Restricts the types allowed in the elements matched by the <xsd:any> |
| childrenCount | <element> | Specifies that the number of children in all the sibling nodes need to be equal |
| minAttributeCount | <anyAttribute> | Specifies the minimum number of attributes to be matched by the xsd:anyAttribute |
| maxAttributeCount | <anyAttribute> | Specifies the maximum number of attributes to be matched by the xsd:anyAttribute |
| valuesCount | <enumeration> | Specifies how many values are to be defined in the enumeration for the rule to match. |
| fixedOccurences | <any> | Ensures that if the <any> matches more than one element type, every element occurs the same number of times in each instance of the container of the <any>. This is necessary to ensure a deterministic structure |

TABLE 1-continued

| Attribute | Allowed in these XSD elements | Notes |
|---|---|---|
| | | compatible with table display. |

The end result of the definition of annotations is that an SDL shape may match an XML instance fragment (or normalized XSD schema fragment) either exactly or loosely, depending on the degree of relaxation defined in the shape itself. The schema can be a relaxed, normalized form of a schema syntax that describes sets of XML instances from the syntaxes of the schemas that were normalized. As such, the validation criterion of the schema is not exclusive but is relaxed. The same overall process utilizing the shape, therefore, can define actions and behaviors which vary based on the exact specification of the shape rather than special cases within the process.

In one implementation, the data services sniffer in block 306 cooperates by suggesting valid components for a user-selected node that can be populated as a field on the editing surface. The suggested components are derived from an analysis of the shape for a selected node of the tree structure and its corresponding instance data. The data services sniffer of block 306 infers meaning from the XML Data Structure with XSD annotations 302 for the user-selected node. For example, repetitive data is inferred to represent a list or table. Isolated data is inferred to represent non-repetitive data. The data services sniffer of block 306 can perform a shape matching routine using a validation process against the XML Data Structure with XSD annotations 302 for the user-selected node. In this case, a schema fragment is used to validate an XML fragment so as to determine if the XML fragment is or is not within a set of possible XML instances defined by that schema fragment. A data structure can be tested as to whether or not an XML fragment is "matched" by a valid shape. This testing determines whether the component having matching a given shape is to be included in a list of suggested components that are presented to the user.

In one implementation, the data services sniffer in block 306 performs an analysis of the shape of the XML Data Structure with XSD annotations 302 for a user-selected node by use of a matching routine in which, for the corresponding selected node of the tree structure, a comparison is made of a fragment of the schema against the shape. A validation can be performed using each of a plurality of XSD schema fragments. The validation makes a comparison of an XML fragment of the user-selected node to determine if one or more shapes are valid for the corresponding XML fragment. The comparison can be made against the XSD schema to derive valid shapes for each user-selected node and can be controlled a decision tree based upon a relaxed XSD standard (e.g. an annotated XSD).

In general, the sniffer in block 106 develops a list of the one or more suggested components that can be validly associated with the user-selected node in accordance with the XML Data Structure with XSD annotations (shape) 302. By way of example, the valid compoennts that can be suggested by the data services sniffer 306 can include one or more of the following: a plain text box, a drop-down list box, a list box, a check box, a rich text box, an expression box, an option button, a button, a section with controls, a section, an optional section, an optional section with controls, a repeating section with controls, a repeating section, controls in a layout table, controls, a repeating table, a bulleted list, a numbered list, a plain list, a hyperlink, a date picker, an inline picture, and a linked picture. The component suggestions from the data services sniffer in block 306 are derived from a component library 310 that contains the plurality of shapes.

Depending upon the XML Data Structure with XSD annotations 302 and the components in the component library 310, the components deemed to be valid by the data services sniffer 306 can also be prioritized by the data services sniffer 306. A display on the user interface of the valid shapes suggested by the data services sniffer 306 can be sorted in order by priority as per predetermined criteria. The user can then be visually presented with a list of components that is sorted by priority and thereby easily understand the most preferred shapes that were suggested by the data services sniffer 306 (e.g. high priority component for a selected node can appear at the top of the component suggestion list).

At block 412 of method 400, the user inputs a selection from among the components suggested by the data services sniffer of block 306. Thus, the user effectively makes a selection of a suggested component for the selected node that is to be visually represented on the user interface. The editing surface upon which the component will appear shows a field that visually appears to be organized as a discreet shape.

The concept of a shape of a data structure can be based upon an abstraction of a schema of XML data. The schema, which may be annotated to relax the validation criteria, can define both a data type and a data structure. As such, the shape is an extension of the schema. The shape can be complex, such as a container having repeating strings of data therein. A shape can also be a relaxed schema (e.g. an annotated XML schema). Stated otherwise, the shape is at least in part dictated by the schema. In a schema, the layout of a tree structure, including the name and type of nodes on the tree structure, are all bundled together. A shape can be more generic than a schema because the shape can describe a data structure without reference to a data type or to a data name. The shape can, but need not, include the data type and the data name. As such, a shape need not be the same as a schema. The shape as a property of a component is used to determine the suggestions offered by data services sniffer 306. The data services sniffer 306 will preferably be configured to suggest only valid components for a user-selected node in accordance with its corresponding shape.

Optional steps 414 and 416 in method 400 allow the user to input further refinements to the presentation of components on the user interface using XML component-specific template logic 3120). Logic 3120) may contain additional XSD with or without annotations to relax the XSD validation criteria.

Once the user has interactively used the user interface to input a selection of a component that was suggested by the data services sniffer 306, a field corresponding to the selected shape and node is inserted at block 418 of method 400 on the user interface in editing surface 104. Although the field is placed at a default position on editing surface 304, the user can input instructions to move the field to a different position on editing surface 304 to create an aesthetic visual presentation of the field.

Once the field is on the editing surface 304, the user can optionally continue to interact with the user interface to create more fields by the steps described above for method 400. Once the one or more fields on the editing surface 304 are satisfactory, the user can interact with the user interface to save the fields so as to create an XML form template (e.g., an electronic form). The saved XML form template can be used interactively by a user to input, view, and/or modify data in an XML file that has an XSD that is defined by the XML form template.

Figure 5:
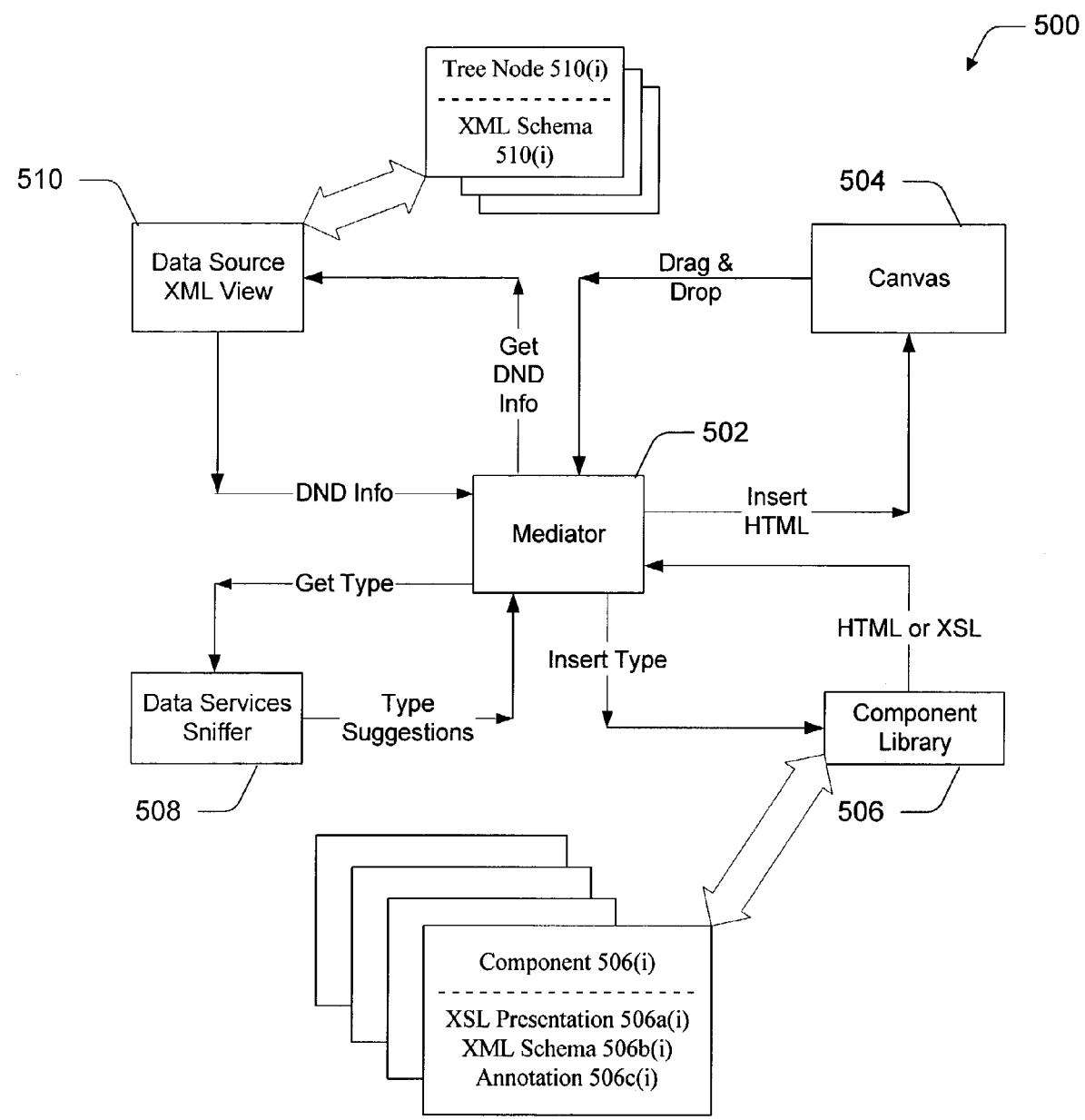
FIG. 5 is a flow chart depicting an implementation of a method for identifying a data structure of a selected XML fragment that is dragged and dropped as a field on an editing surface of a user interface for a visual representation of the selected XML fragment that has the identified data structure.

FIG. 5 is an example of a method 500 that is similar to method 400 in terms of the result of creating a field on an editing surface but is different in that method 500 features a user's drag and drop input to the user interface. The drag and drop input places the field on the editing surface at the location where the user dropped the selected node that had been dragged by the user's input. Rather than having a component selected by the user from choices offered by the data services sniffer 306, the field takes on a default shape supplied by the data services sniffer 306. This aspect is seen in method 500 at block 504 where a user drags a node from a tree structure to a location on an editing surface where the node is dropped (e.g. the node is dropped at a locus on a canvas 504 in FIG. 5). At block 502, method 500 features a mediator 502 in a mediation process that inserts a data type for the selected node. The data type of the node is submitted for a comparison and/or validation routine against a component library 506. Component library 506 contains schema for XML component templates that are selectively fed back to mediator 502 in the form of an XSL style format, or optionally HTML, to mediator 502. Mediator 502 also obtains information (e.g. data node datum—DND) from the selected node of the tree structure seen at reference numeral 510 in FIG. 5. Mediator 502 uses these various input to commission a data services sniffer routine at block 508 of method 500. A default component is derived by execution of the data services or data services sniffer routine at block 508. The result of this routine is that the default component (e.g. data structure) is fed back to mediator 502. The default component can then be automatically placed in a visual representation of a field on the editing surface (e.g. a canvas 504). Once the default component is visually represented on the user interface in the editing surface, the user can then further refine the placement of the field and/or alter the shape thereof by steps such as block 414–416 set forth in method 400.

Overview of Technique for Creating Electronic Forms

Figure 6:
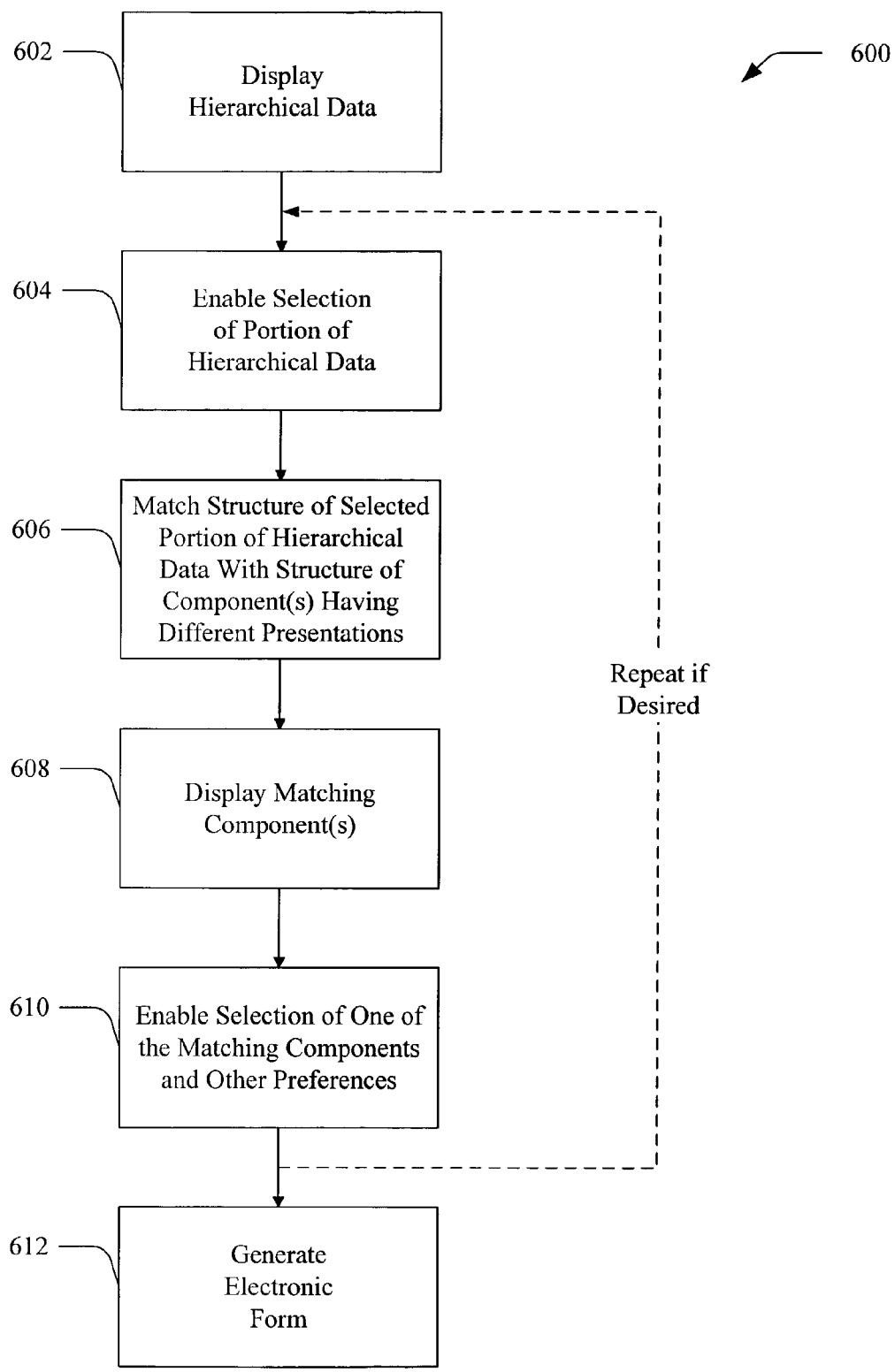
FIG. 6 is a flow diagram of an exemplary process for generating an electronic form.

FIG. 6 shows a process 600 for modularly generating an electronic form. The process 600 is illustrated as a series of blocks representing individual operations or acts performed by the system 100. The process 600 may be implemented in any suitable hardware, software, firmware, or combination thereof. In the case of software and firmware, the process 600 represents a set of operations implemented as computer-executable instructions stored in memory and executable by one or more processors.

Displaying Hierarchical Data

At block 602, the system 100 displays hierarchical data. The hierarchical data is displayed so that a designer can chose particular parts of the hierarchical data to be represented in an electronic form that the designer wants to build. The system 100 displays the hierarchical data so that it is easy for the designer to choose a particular part of the hierarchical data, such as by clicking on an icon.

Figure 7:
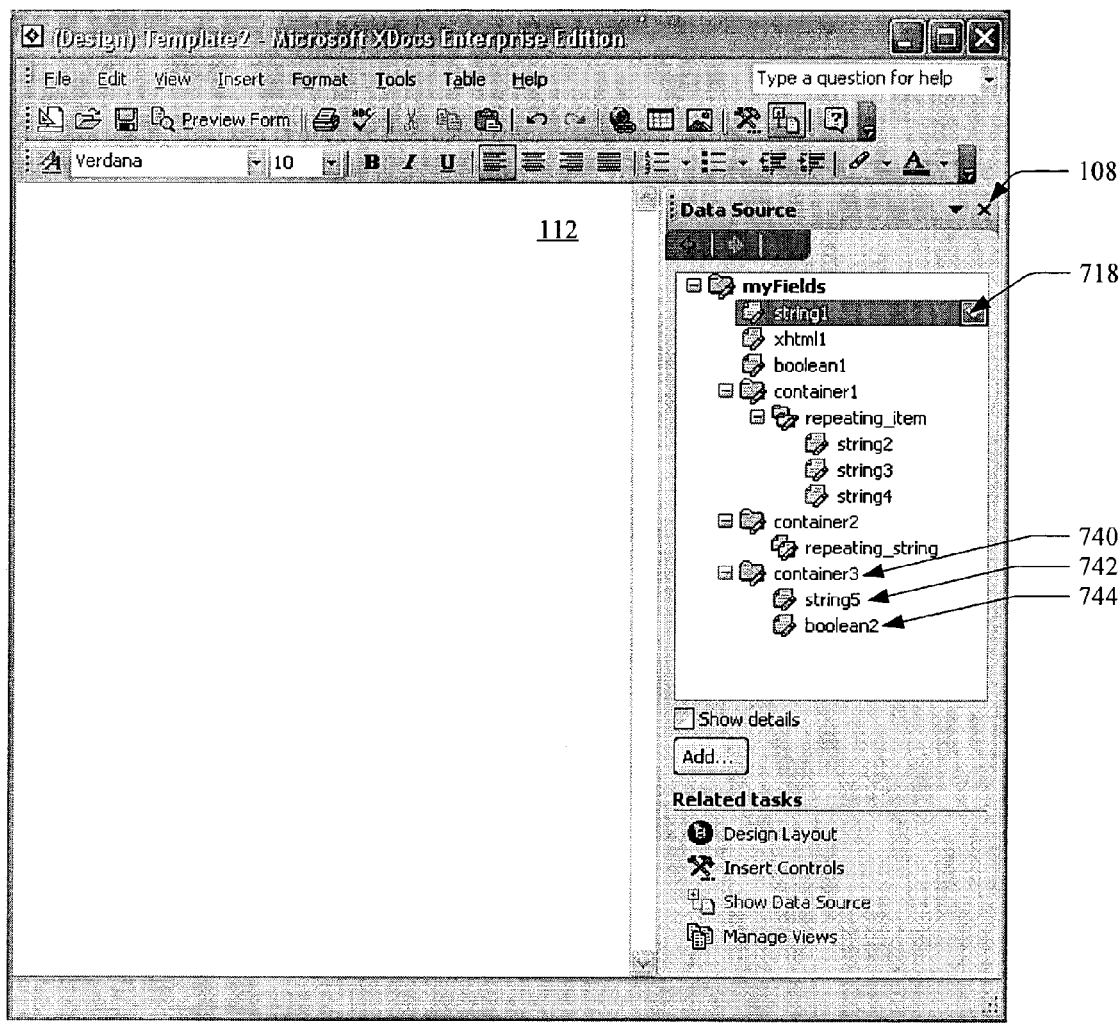
FIGS. 7–27 are a sequence of successive screen shots that are presented to illustrate an implementation in which an exemplary electronic form is created by building a view on XML data through a set of XML component templates from which a forms designer selects certain suggested XML component templates.

FIG. 7 shows an example data display area 108 in which hierarchical data is displayed as icons with associated names. For instance, the depicted data includes such items of data named "myFields," "string1," "xhtml1," "container1," "repeating_item," "string1," and so forth to "boolean2". Each of these named icons represents a part of the hierarchical data. These icons make it easier to understand the hierarchical data, especially for a designer unfamiliar with the often-complex details of hierarchical data. These icons can also make it easier for a designer to select particular parts of the hierarchical data. Whether with icons, text, or otherwise, the system 100 makes the structure of the hierarchical data apparent to a designer.

In FIG. 7, the hierarchical data is arranged in the form of a tree. The named icons are representative of nodes in the tree. The tree structure presents a visual hierarchy to the data, where certain nodes are nested within other nodes. For instance, a parent "container3" node 740 contains a "string5" node 742 and a "boolean2" node 744, which is set forth graphically by the "string5" node 742 and the "boolean2" node 744 being indented relative to the "container3" node 740.

Nodes, as well as parts of hierarchical data not presented in a tree, have a structure. This structure can include rules governing the node itself or the type of information that the node can contain.

There are various types of languages with which hierarchical data files are written, such as markup languages. One of the most common types of markup language is the eXtensible Markup Language, or XML. Markup-language data is often used to transfer, store, or represent data.

Selecting a Part or Node of the Hierarchical Data

At block 604, the system 100 enables selection of a portion of the hierarchical data. In FIG. 7, the designer has selected the "string1" node 718 as represented by the highlight bar placed at the node. Selection can be made using conventional user interface techniques, such as a computer mouse pointer, a stylus, a touch screen, or some other input mechanism that facilitates selection of a specific item. The designer selects a portion of hierarchical data by clicking on (or tapping, or otherwise identifying) the icon or text name representing a particular part of the hierarchical data.

Components Associated with the Selected Portion

Once the system 100 receives a selection of a portion of the hierarchical data, the system 100 compares the selected portion to find a match against a plurality of shapes and/or data types, where each shape and/or data type is associated with a component. The system 100 accumulates the matches that are found and then displays a list of one or more suggested components that correspond to a valid match with the selected portion of the hierarchical data (block 606 in FIG. 6). The components can be displayed in various ways such that a designer is able to readily choose among possible components (if a choice needs to be made). The suggested components can be depicted in a separate area, such as a separate graphical window or pane.

Figure 8:
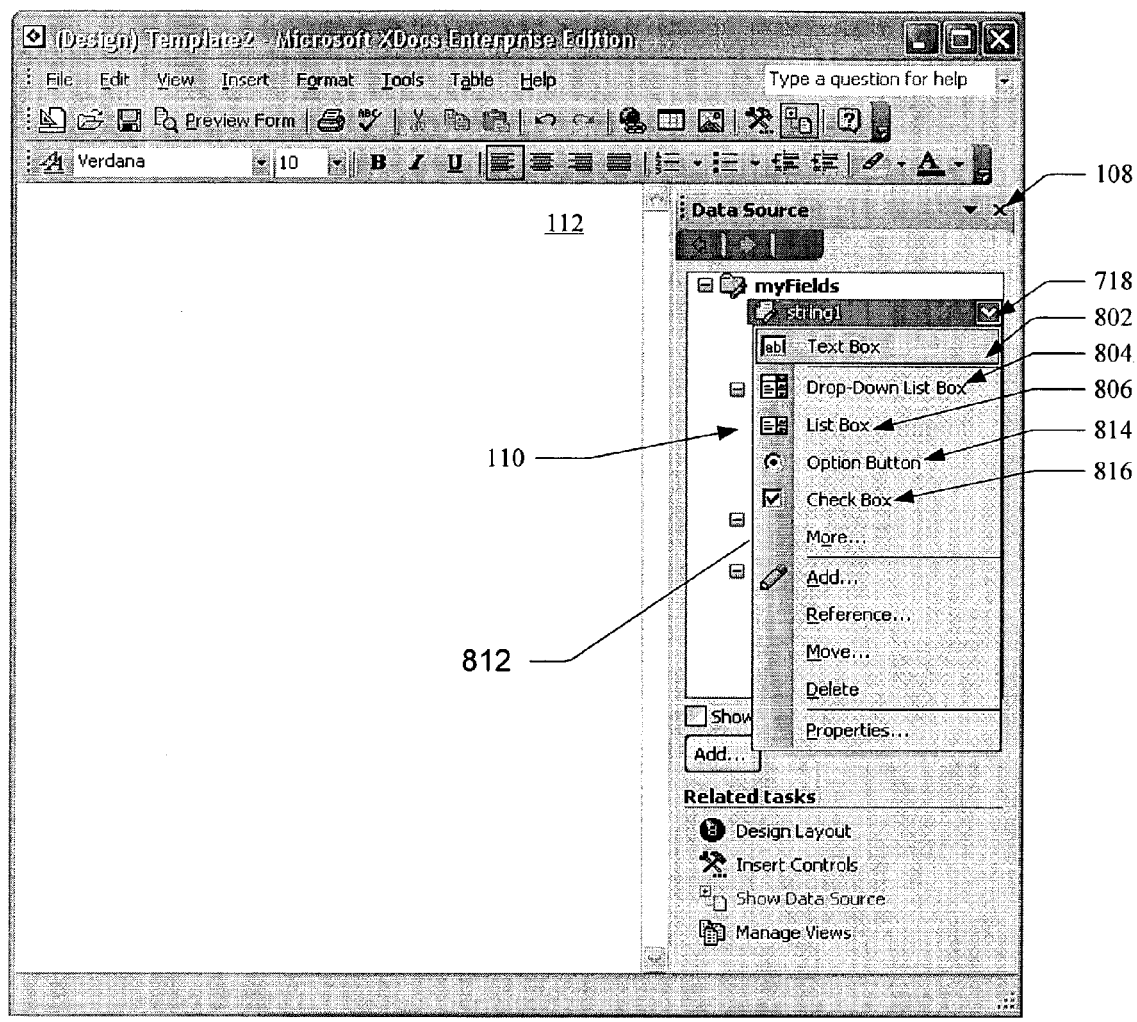

FIG. 8 illustrates an exemplary component display area 110 that is depicted upon selection of the "string1" node 718 in the data display area 108. The component display area 110 is illustrated as a pop-up menu or list that is positioned just beneath the selected data item and overlies the data display area 108. The component display area 110 contains a list of suggested components that correspond to a valid match with the selected node 718. That is, each component sets forth how the selected part of the hierarchical data could be represented in the electronic form. In this example, the selected "string1" node 718 can be represented by the following suggested components: a text box 802, a drop-down list box 804, a list box 806, an option button 814, a check box 816, and so on. The component display area 110 may further include other menu options that enhance the usability for the designer. These options may be general or context specific. Representative options "Add", "Reference", "Move", "Delete", and "Properties" are illustrated in FIG. 8.

When a selection of a portion of the hierarchical data is made, the component display area 110 can alternatively present an unrestricted list of the entire library of components known to the system 100. In such a case, the component display area 110 presents a scrollable list or some other mechanism that allows the designer to move through the library and select the desired component. Alternatively, the system 100 can display a reduced set of components based upon predetermined criteria. The system 100 identifies which components are associated with a selected portion of hierarchical data according its structure. Thus, if the structure of the portion of hierarchical data allows for storage of only textual data, the system will suggest as a default only those components that allow for entry of just textual data. Likewise, if the structure of a portion allows for multiple fields of data, the system will provide to a designer components allowing for multiple fields, such as components allowing for repeating sections and/or a repeating table, like the drop-down list box 804 and the list box 806 of FIG. 8.

Components may be constructed in various ways. Components can be written in a transformation-language. These transformation-language components are code that can be used to transform pieces of markup-language data (a type of hierarchical data) into visual and/or structural fields in an electronic form that are consistent with the structure of the markup-language data. Examples of transformation-language components include files, applets, or other code written in Cascading Style-Sheet Language (CSS) and eXtensible Style-sheet Language Transformation (XSLT) languages.

In one implementation, transformation-language components are written in XSLT. XSLT components include those shown in the component display area 110: the text box 802, the drop-down list box 804, the list box 806, the option button 814, and the check box 816. These components in the component display area 110 are represented with icons that approximate the data-entry fields that the components can be used to create in an electronic form.

For example, if a designer chooses a piece of the markup-language data and the piece has only Boolean information or a structure allowing for only Boolean information (e.g., yes or no) (e.g., the "boolean2" node 744 in FIG. 7), the system 100 will display only those suggested components that are matched as being compatible with the Boolean information and/or structure. The option button 814 or the check box 816 in the component display area 110 of FIG. 8 are examples of compatible components.

Components, whether transformation-language components or otherwise, can be used to create operable fields in electronic forms. Operable fields, such as data entry fields, when integrated into an electronic form, can display or receive information. The information received can be input by a user of an electronic form containing the data-entry field or the information can be copied (automatically or otherwise) from a data source of hierarchical data containing the information. The "Purpose" data-entry field 208 of FIG. 2, is one example of a data-entry field.

The components associated with the selected part of the hierarchical data, whether a transformation-language component or otherwise, are displayed in component display area 110 so that a designer can chose between them. Components do not need to be displayed, however, if one is chosen by the system 100, such as by a particular component being a default choice or if there is only one component associated with a selected portion of hierarchical data.

In one implementation, the system 100 chooses the component (such as by intelligently determining a component most likely to be desired based on the designer's history of choosing or an algorithm), lessening the need for displaying multiple components unless a designer requests otherwise.

Choosing a Component and Other Preferences

At block 610, the system 100 enables the designer to choose one of the suggested components that was matched as being valid for the selected portion of hierarchical data. The designer can make this choice using similar user interface techniques that are employed to select a particular portion of hierarchical data. The system 100 can, for instance, enable a designer to select a component by clicking on an icon or text for a component in the component display area 110 (FIG. 8). Alternatively, the system 100 can enable a designer to drag and drop a component from the component display area 110 to the form-design area 112, thereby choosing the component and the placement of the component on the form-design area 112. The system 100 then displays the selected component on the form-design area 112. The selected component can be displayed at a place on the form-design area 112 where a designer selects, or placed where it will not obscure another component on the form-design area 112.

Figure 9:
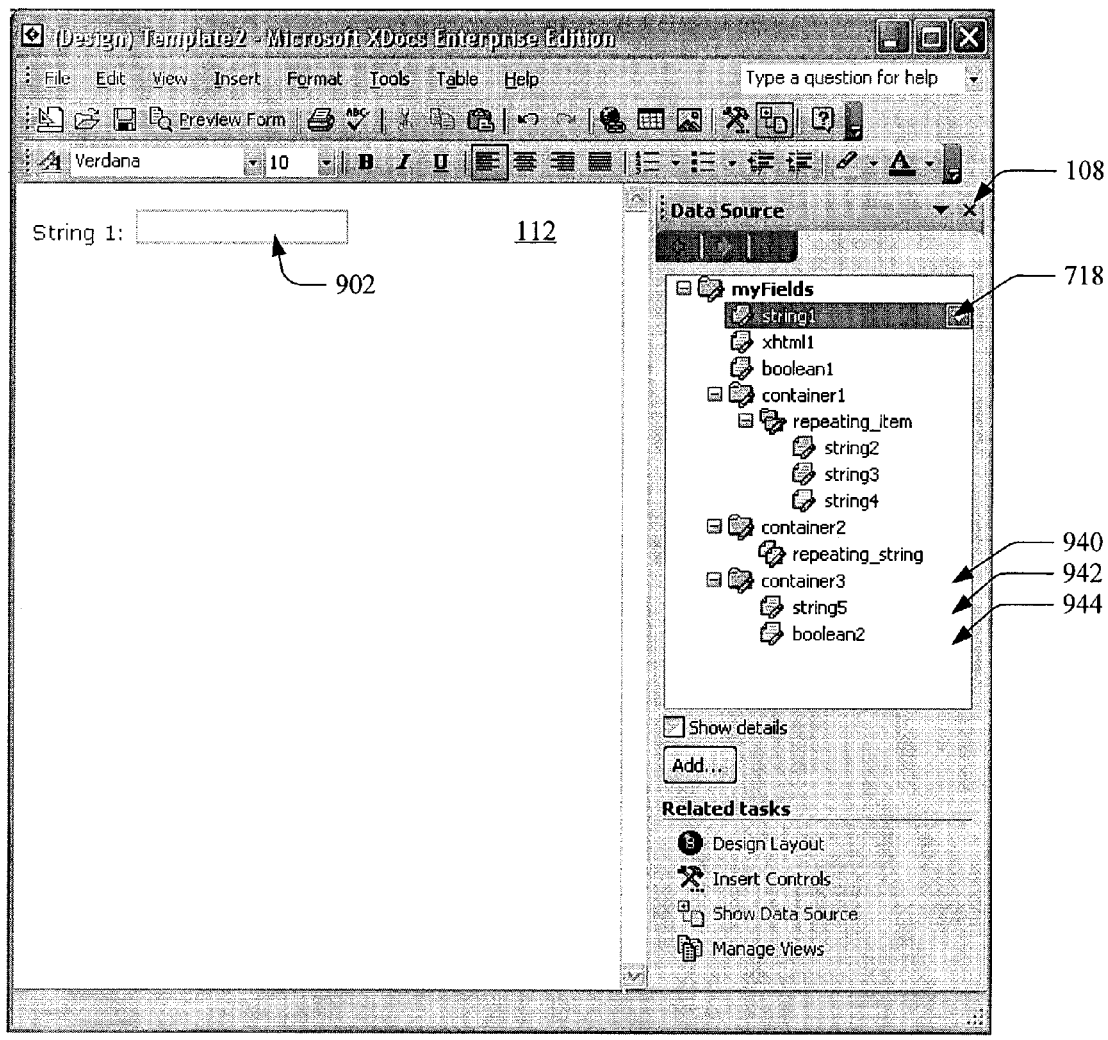

Continuing our example, after the designer selects the string1 node 718 in the data display area 108 (FIG. 7) to invoke the list of suggested components in component display area 110 (FIG. 8), the designer can choose one of the suggested components in component display area 110. In this example, the designer chooses the text box 802 and identifies where the field created with the component is to be positioned in the form-design area 112. This can be done by dragging and dropping the component from the list 110 onto the form-design area 112, such as the upper left hand corner of form-design area 112 as shown in FIG. 9. The forms designer application 126 will display the selected text box 802 component substantially as it will appear as an operable field (a text box representation 902, which has the corresponding name "String 1").

However and wherever placed, components generally can be moved and altered by a designer to allow the designer to create an electronic form to match the designer's preference. In one implementation, the system 100 enables a designer to place a component onto the form-design area 112 wherever the designer chooses. This allows the designer freedom to easily organize and create a view (and eventually an electronic form) of one or more components on the form-design area 112.

The system 100 enables a designer not only to choose a particular suggested component, but also other preferences. These preferences can include the placement on the form-design area 112 of each component. These preferences can also include alterations to the components, like the size, font, color, orientation, and the like.

The system 100 also allows a designer to request changes to the form-design area 112 that are not related to components, such as adding text and graphics to the form-design area 112 (such as the header "Travel Itinerary" shown in FIG. 2's example of the form-design area 112). In one implementation, these preferences can include most of the preferences available to a user of a typical word-processing program.

A designer can choose additional parts of an arrangement of hierarchical data and select additional components associated with the chosen parts of hierarchical data to add to the form-design area 112. Continuing the above example, after the text box representation 902 is displayed on the form-design area of FIG. 9, a designer could continue to select the same or another portion of the hierarchical data in the data display area 108 and position the corresponding component onto the form.

Figure 10:
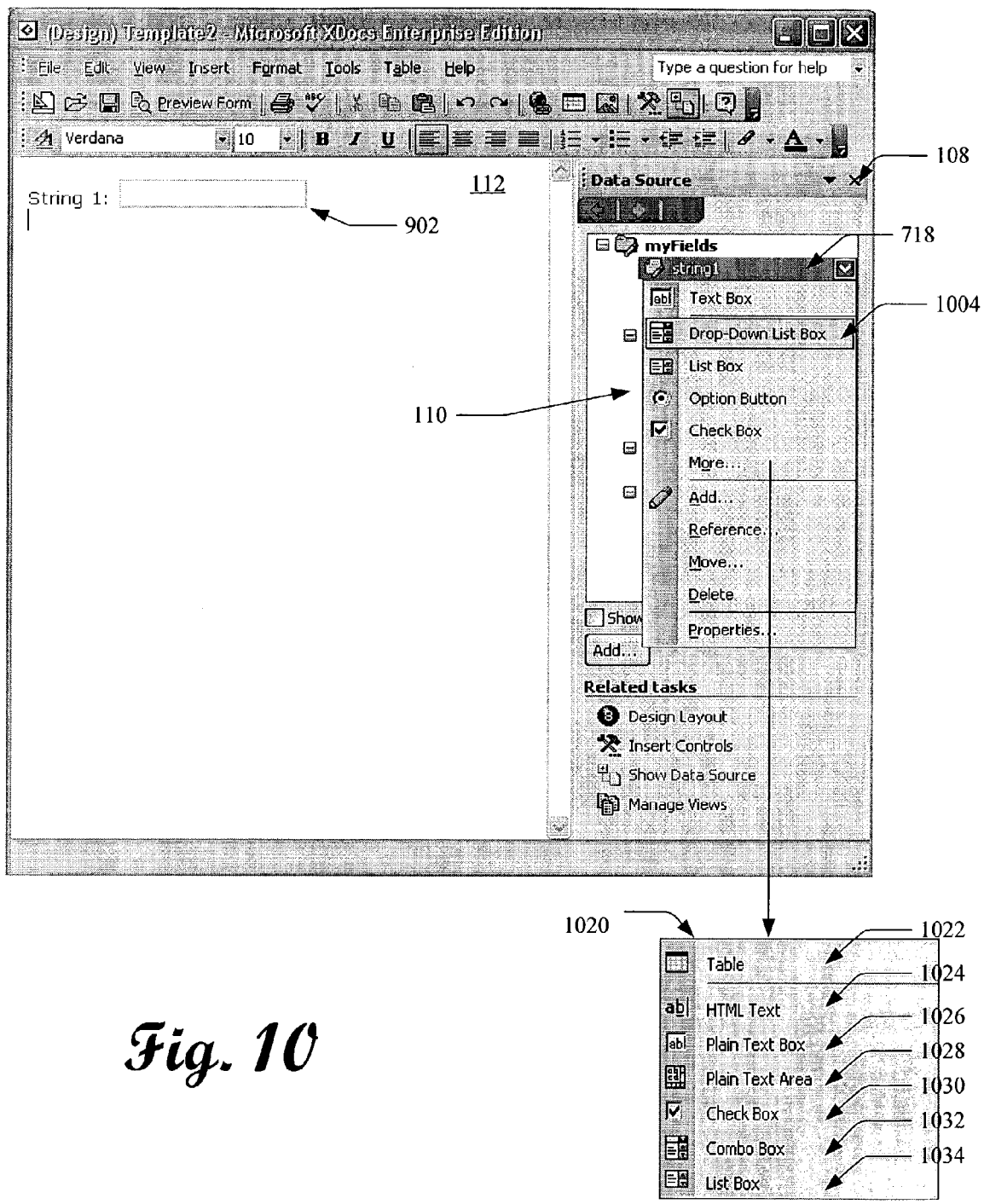

FIG. 10 shows an example of a designer selecting the "string1 node 718 and then choosing a different component, in this case a drop-down list box 804 from the component display area 110. This example also illustrates another feature, in that the selection of a suggested component may invoke another menu that presents further design options for the selected suggested component. Here, selection of the drop-down list box 804 causes a secondary or auxiliary component display area 1020 to be depicted on the screen (although it is illustrated in FIG. 10 off the screen for clarity and purposes of discussion in relation to the underlying areas 110 and 108). The location of this display area 1020 is configurable, and may be located just beneath the selected drop-down list box item in display area 110, or elsewhere. The auxiliary component display area 1020 includes various suggested component alternatives for implementing the drop-down list box 1004, including a table 1022, an HTML text 1024, a plain text box 1026, a plain text area 1028, a check box 1030, a combo box 1032, and a list box 1034.

Figure 11:
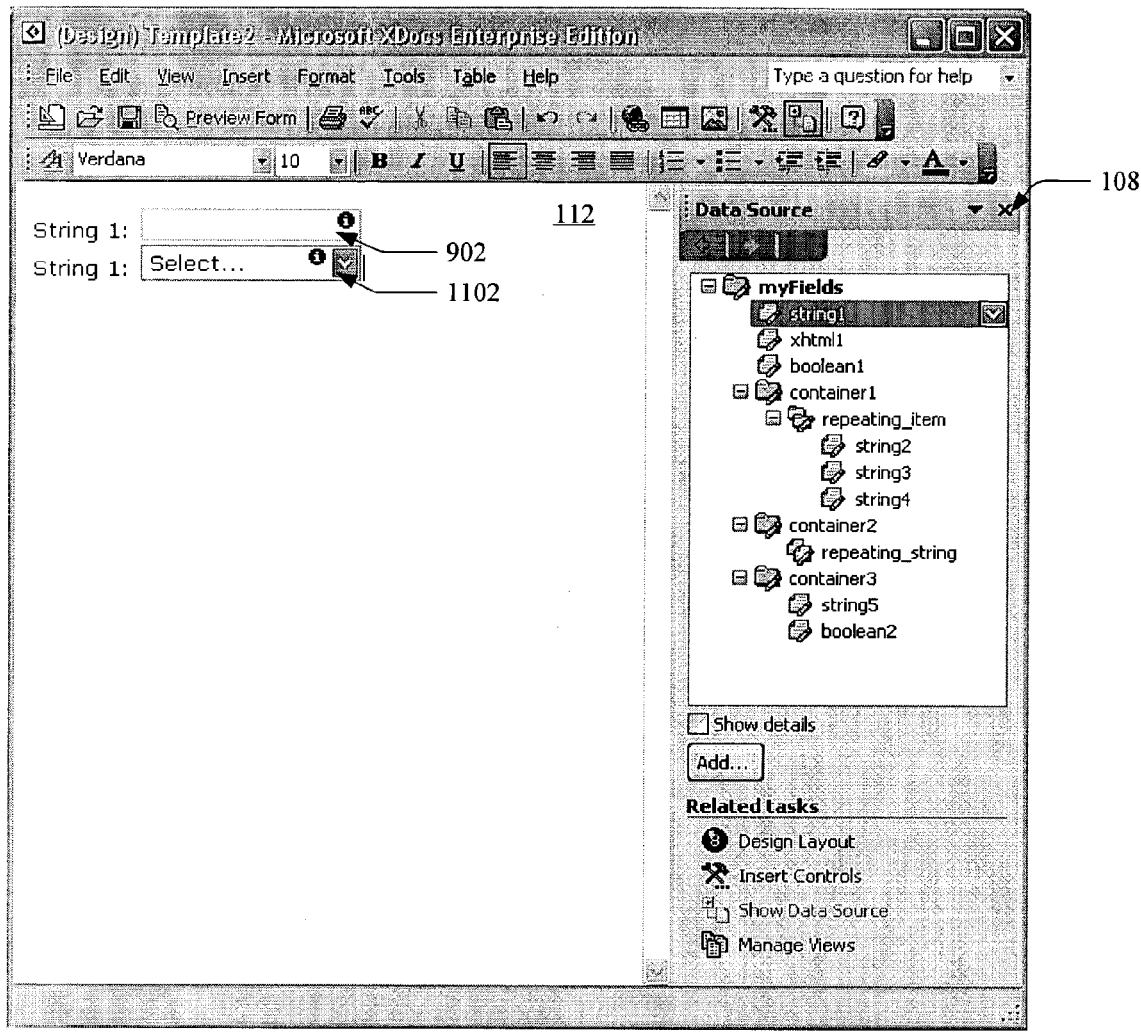

From this auxiliary list, suppose the designer chooses the combo box 1032 and positions that component onto the form-display area 112 just beneath the text box representation 902. The forms designer application 126 uses the selected combo box 1032 to represent what will be an operable drop-down list data-entry field in the electronic form (a drop-down representation 1102 shown in FIG. 11). Since the component is derived from the "string1" node 718 in data display area 108, the drop-down representation 1102 is initially given the name "String 1" as shown in FIG. 11. This name can be subsequently edited, if the designer so desires.

A designer can continue to add components and make alterations to the form-design screen 112. By allowing additions and alterations to the form-design screen 112, the system 100 enables a designer to easily and intuitively create an electronic form built to the designer's preferences. A designer could, for example, continue to add components and make alterations to the components and form-design area 112 until the designer has created a form-design area like the form-design area 112 of FIG. 2, entitled "Travel Itinerary."

Generating an Electronic Form

At block 612, the system 100 generates an electronic form. Components placed within the form-design area 112 are used to generate an electronic form. The electronic form is the product of the placement of various selected components on the form-design area 112, and can include where these components were placed, how they were altered, and any stylistic changes made to how these components are displayed on or to the form-design area. Once created, the electronic form visually mimics the look of the form-design area at the time the designer decided to create the electronic form.

Further examples are given below with respect to FIGS. 12–27 for the system 100 generating a view of a data-entry field on an electronic form for different data-types and/or structures in a hierarchical data source based upon a selection from among different suggested components.

Figure 12:
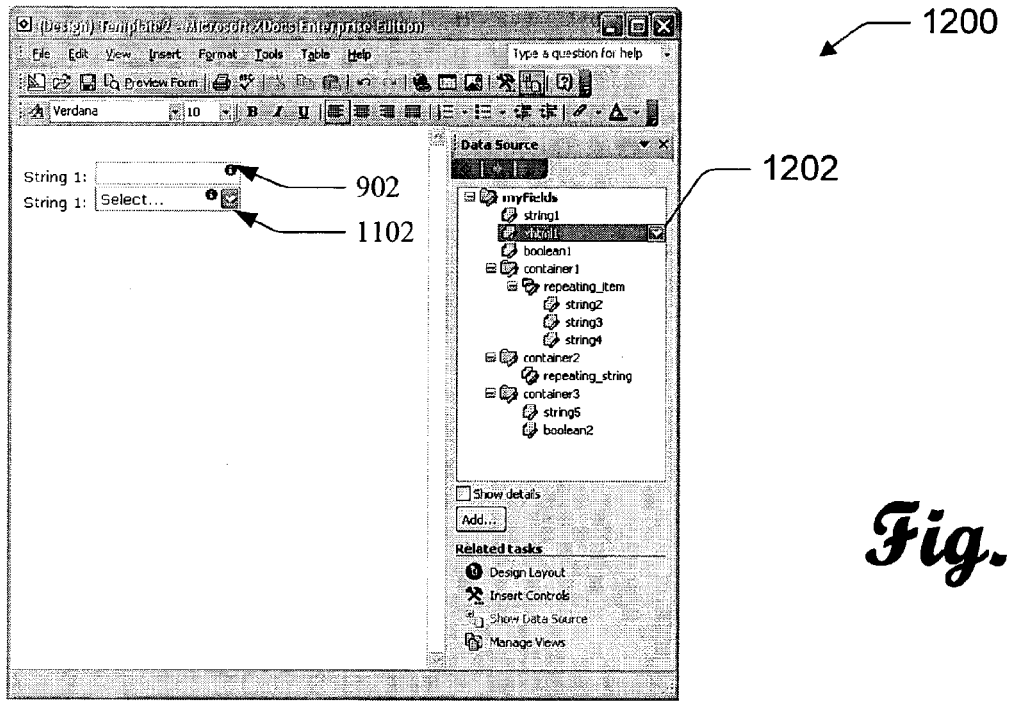
Figure 13:
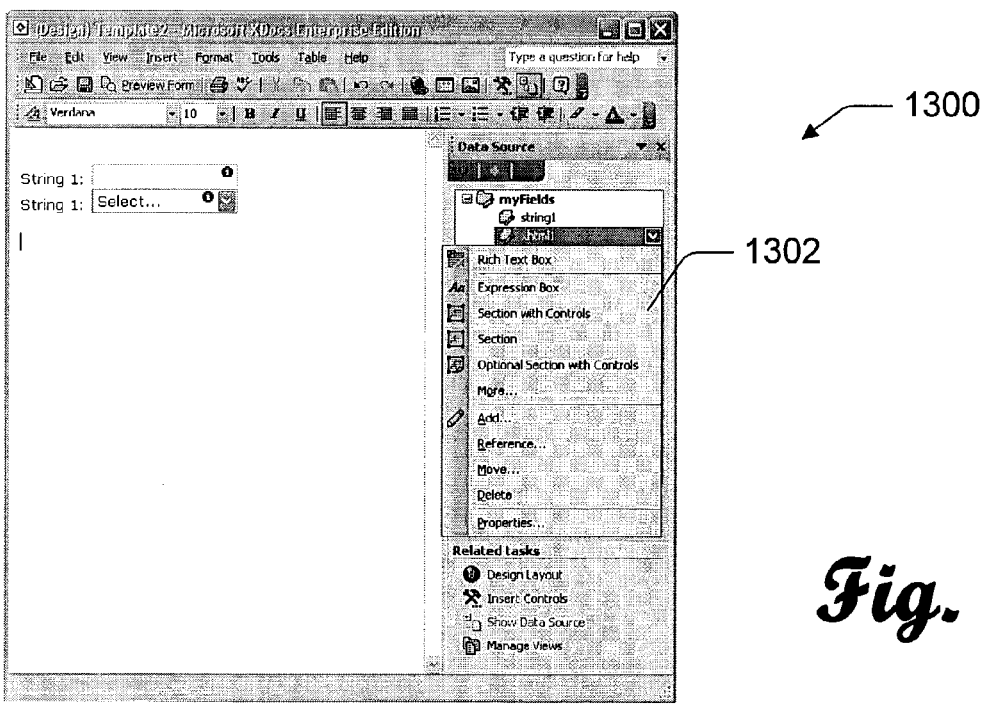
Figure 14A:
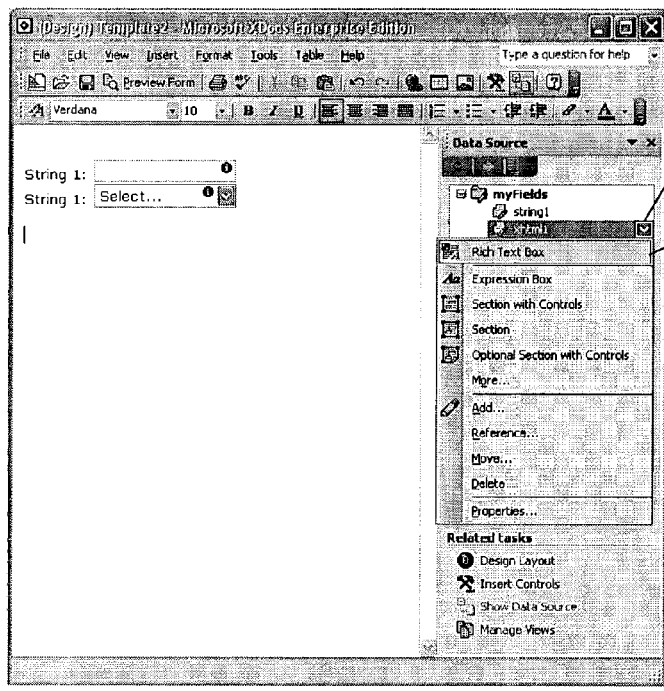
Figure 14B:
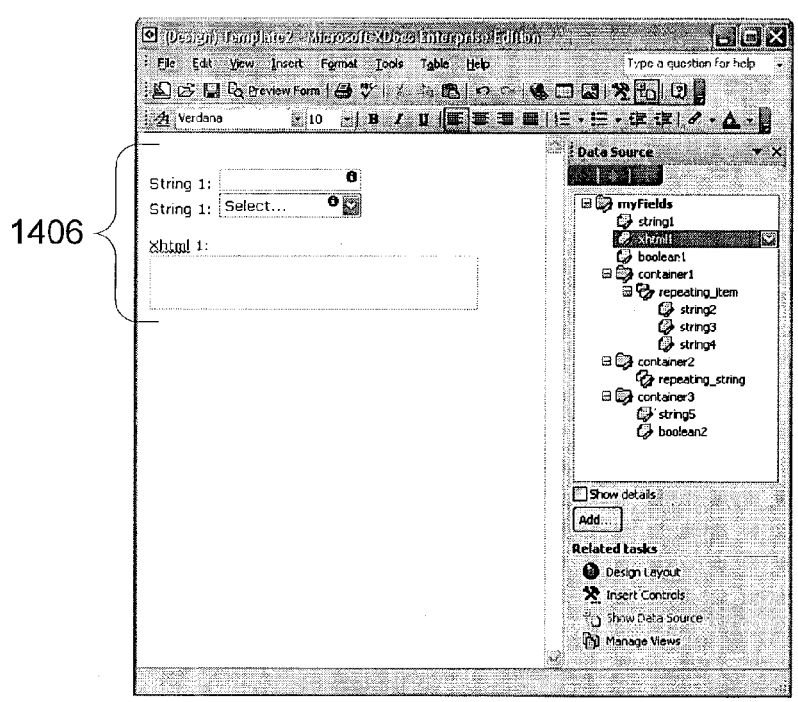

In FIG. 12, the user selects the xhtml1 node 1202 to which the execution of a routine for the data services sniffer 306 (FIG. 3) suggests the components in list 1302 in FIG. 13. Since the xhtml1 node 1202 is a data type that is different from the string1 node 718 (XHTML content versus string content), the suggested components in list 1302 in FIG. 13 for xhtml1 node 1202 are different from the suggested components in list 812 in FIG. 8 for string1 node 778. In FIG. 14a, the user inputs the selection of the suggested Rich Text Box 1402 components for html1 node 1404 which results in the additional insertion of the third field titled "Xhmtl 1" in the field 1406 of the editing surface as seen in FIG. 14b.

Figure 15:
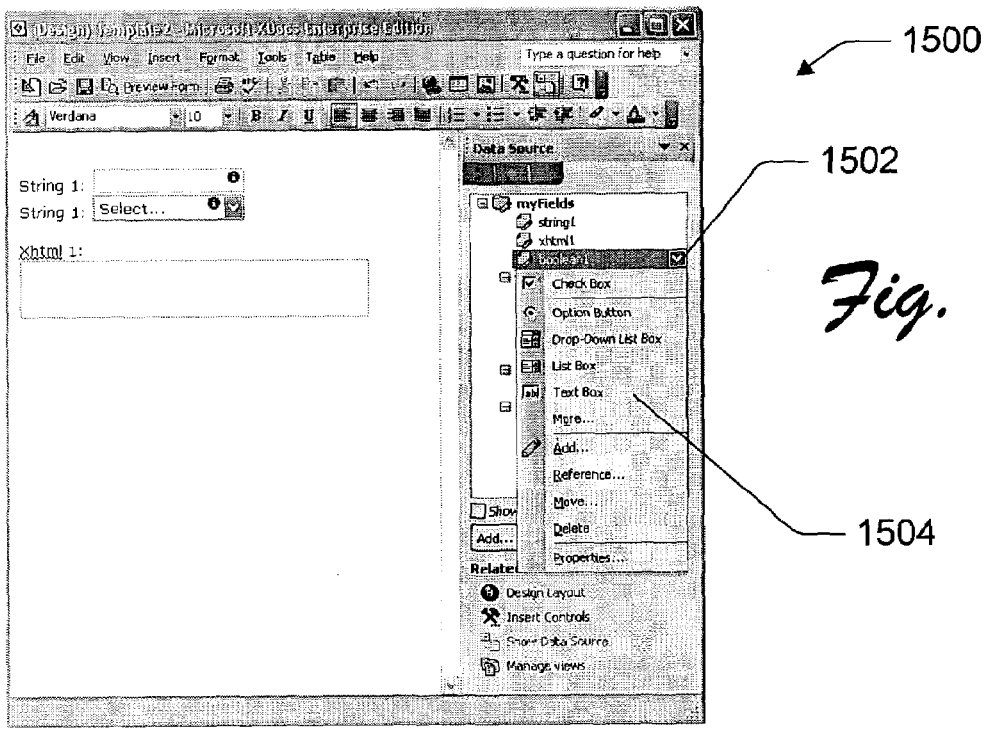
Figure 16:
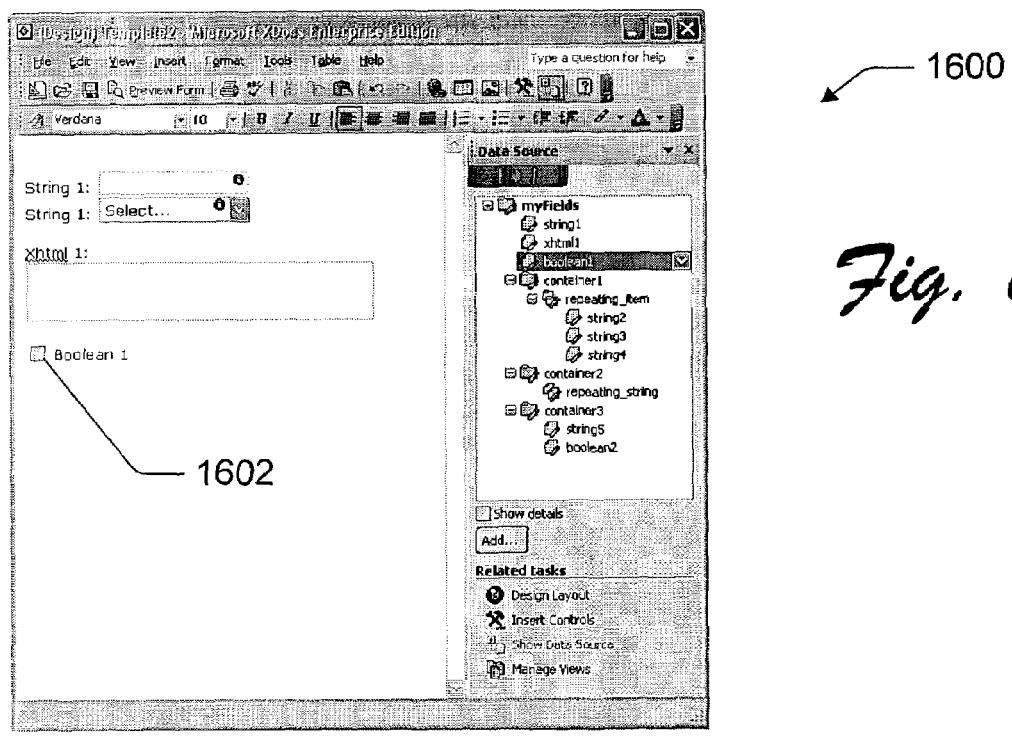

FIG. 15 shows the user's selection of the boolean1 node 1502 for which the data services sniffer 306 suggests the components in list 1504. A list 1504 of suggested components for boolean1 node 1502 is similar to the suggestions that are present in list 812 for string1 node 718 but are in a different order because the data type is different. In this case, the check box shape is a better match for the Boolean data type which is binary (e.g. true/false, on/off, 0/1, etc.). The prioritization of the matches can be set by predetermined criteria for ach respective component. FIG. 16 shows the insertion of check box field 1602 in the editing surface of the user interface which is bound to boolean1 node 1502.

Figure 17:
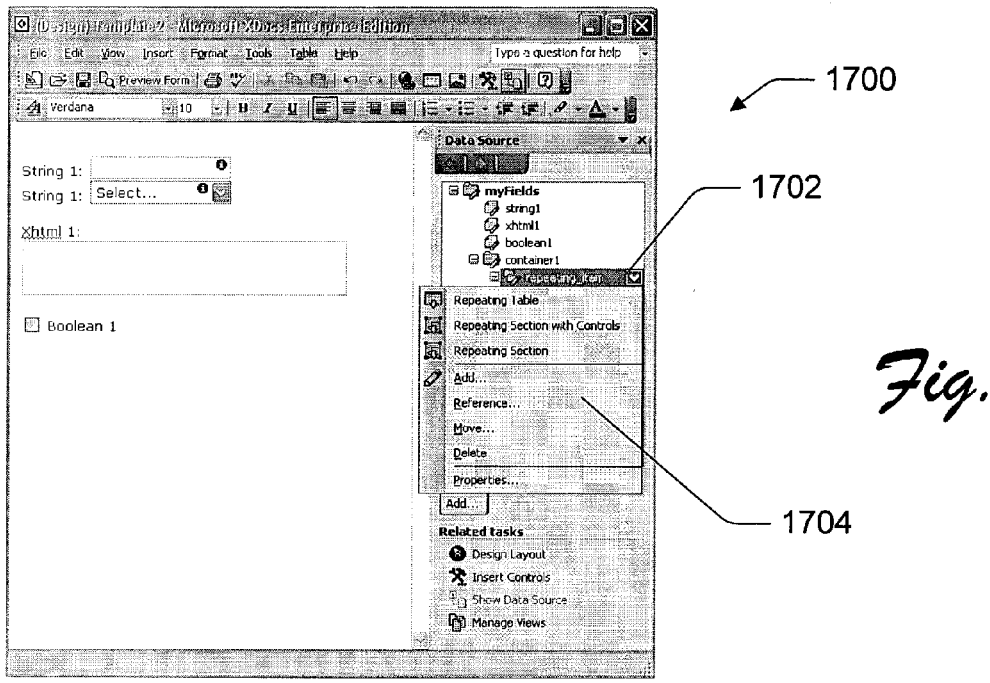
Figure 18:
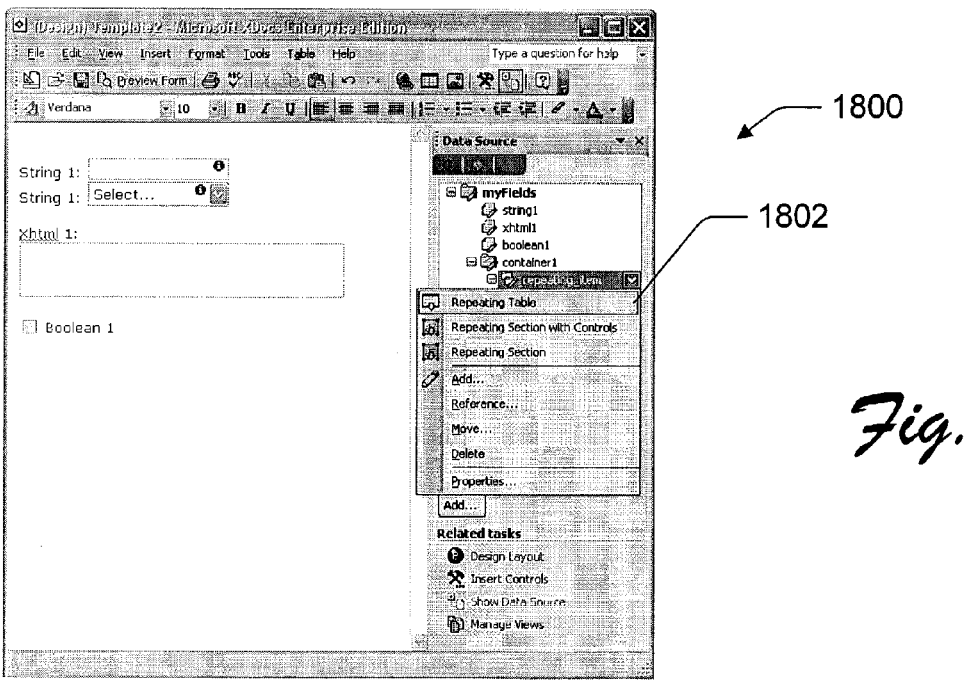
Figure 19:
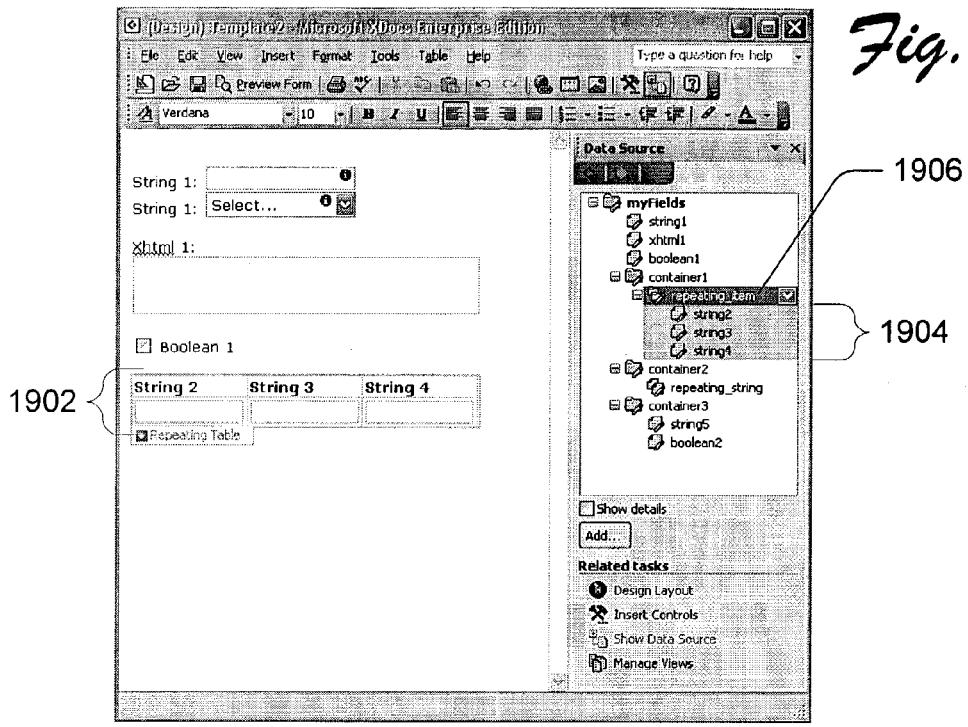

FIG. 17 shows the user's input selection of the repeating_item node 1702 for which the data services sniffer 306 suggests the components suggestion list 1704. FIG. 18 shows the users selection of the Repeating Table 1802 component from the component suggestions list 1704. The result of the user's input selection is seen in FIG. 19 at field 1902. Field 1902 contains sub-nodes 1904 of the repeating_item node 1906. Each sub-node has a heading over a respective column in field 1902 that is inserted into the editing surface by the forms-design application 126 of FIG. 1.

Figure 20:
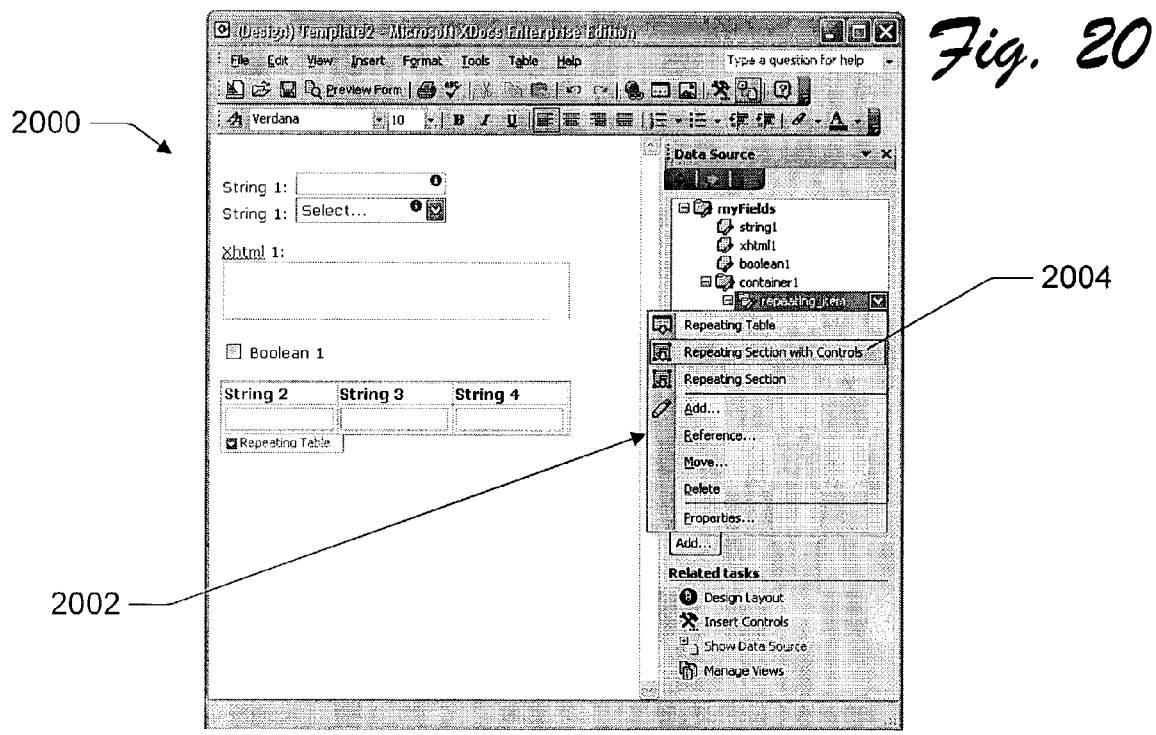
Figure 21:
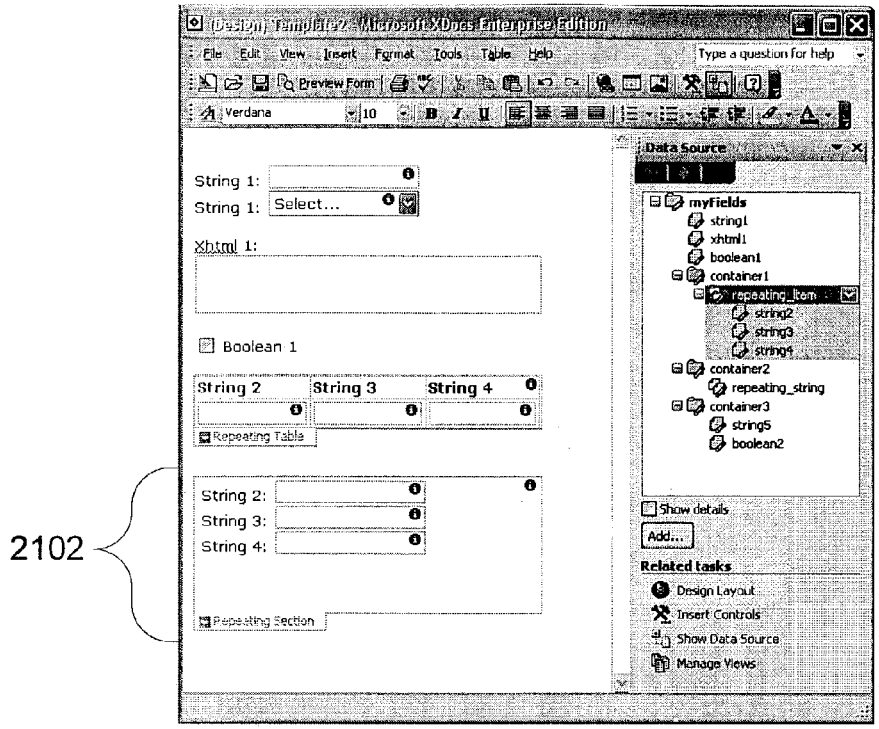

In FIG. 20, a display 2000 indicates that components 2002 are suggested for an addition to the visual representation of repeating_item node 1906. A selection of the "Repeating Section with Controls" component 2004 results in the insertion of a field 2102 in the editing surface as depicted in FIG. 21. Field 2102 has a field name inserted by the forms designer application 126 onto the editing surface that corresponds to each of the three sub-nodes 1904 (string1, string 2, and string3) of the repeating_tem node 1906.

Figure 22:
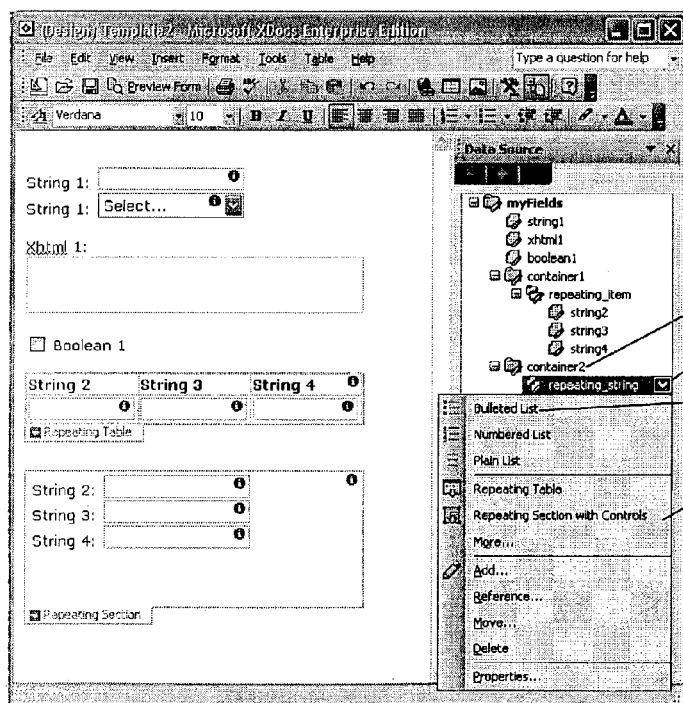
Figure 23:
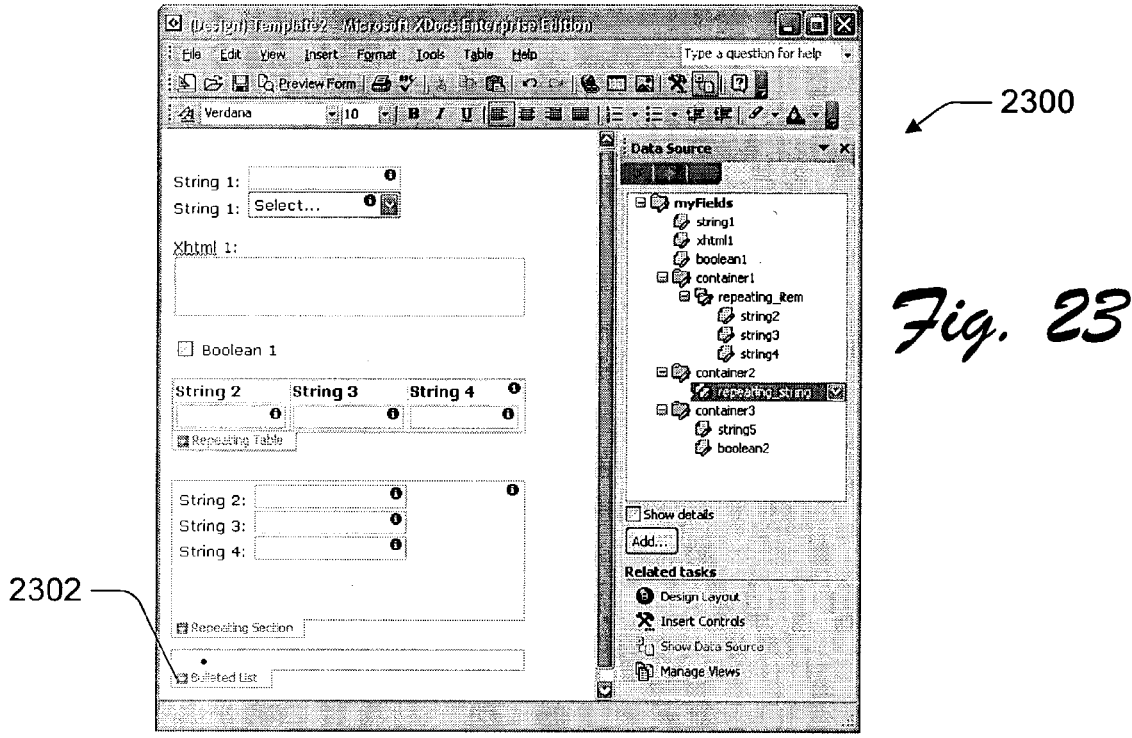

FIG. 22 shows the user's input selection of the repeating_string node 2202 which is a sub-node of container2 node 2204. The data services sniffer 306 suggests the components in list 2206 for the repeating_string node 2202. FIG. 23 shows the users selection of the Bulleted List 2208 component from the suggestions in list 2206. The result of the user's input selection is seen in FIG. 23 at field 2302.

Figure 24:
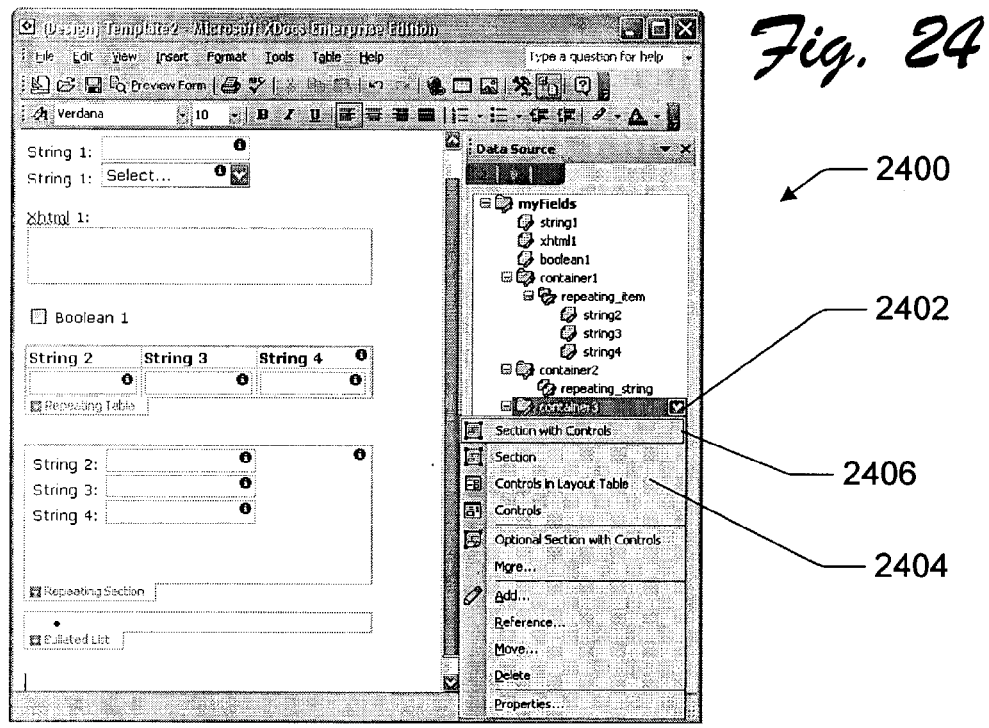
Figure 25:
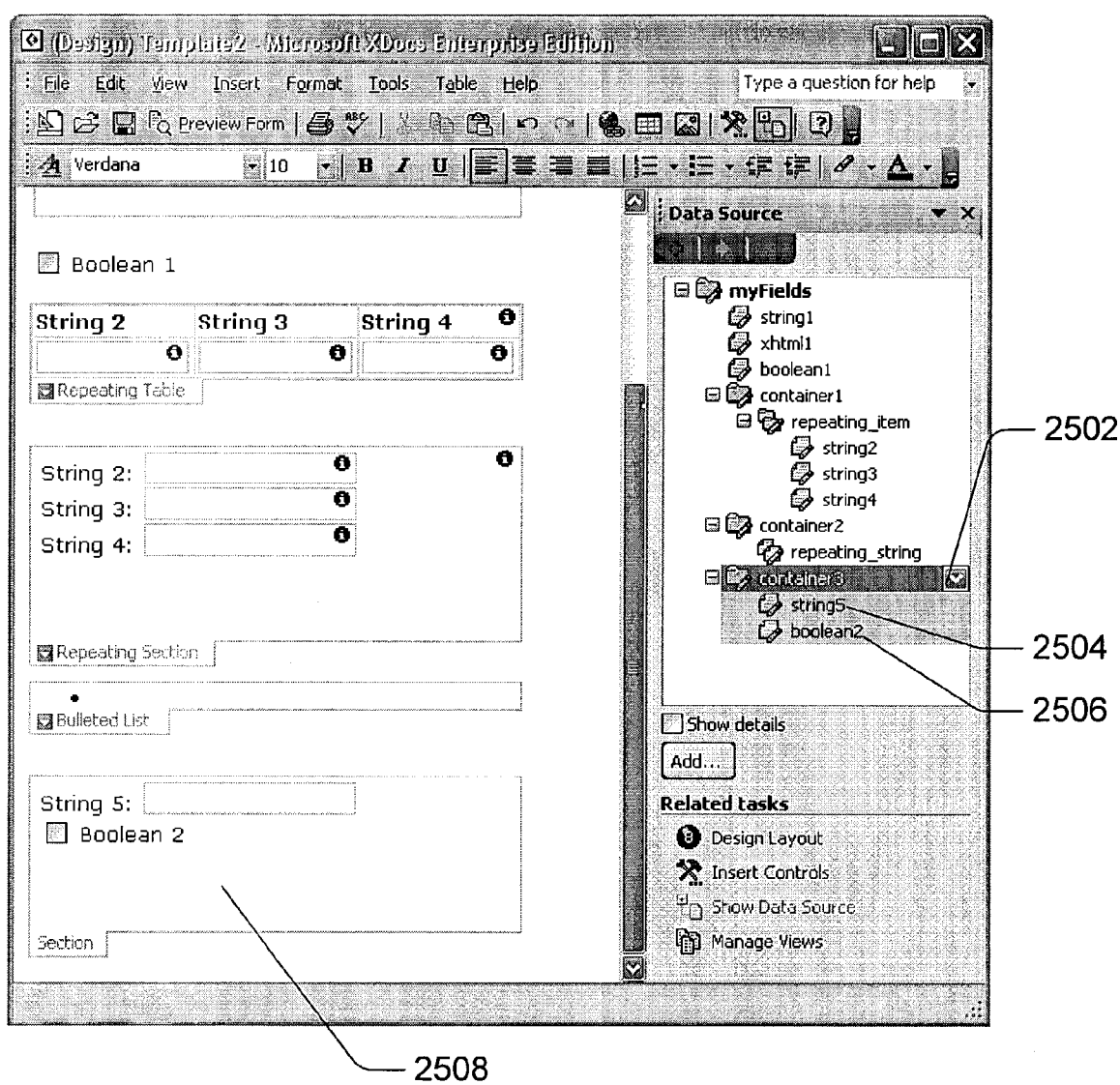

FIG. 24 shows the user's input selection of the container3 node 2402 which has the sub-nodes, seen in FIG. 25, of string5 2504 and boolean2 2506. The data services sniffer 306 suggests the components in list 2404 for the container3 node 2402. The component suggestions in list 2404 are for non-repeating container shapes. The user selects the suggested component "Section with Controls" 2406. This selection results in the insertion of field 2508 in FIG. 25 which has a section that includes insertions for the sub-nodes string5 2504 and boolean2 2506. The components for the insertions in field 2508 that are bound to the sub-nodes string5 2504 and boolean2 2506 are added automatically (e.g. by default). As such, the user need not select a component for either sub-node. Stated otherwise, with respect to field 2508, FIG. 25 shows that components for the string5 node 2504 and the boolean2 node 2506 have been created automatically due to a recursive data structure suggestion mechanism performed by the data services sniffer 306.

Figure 26:
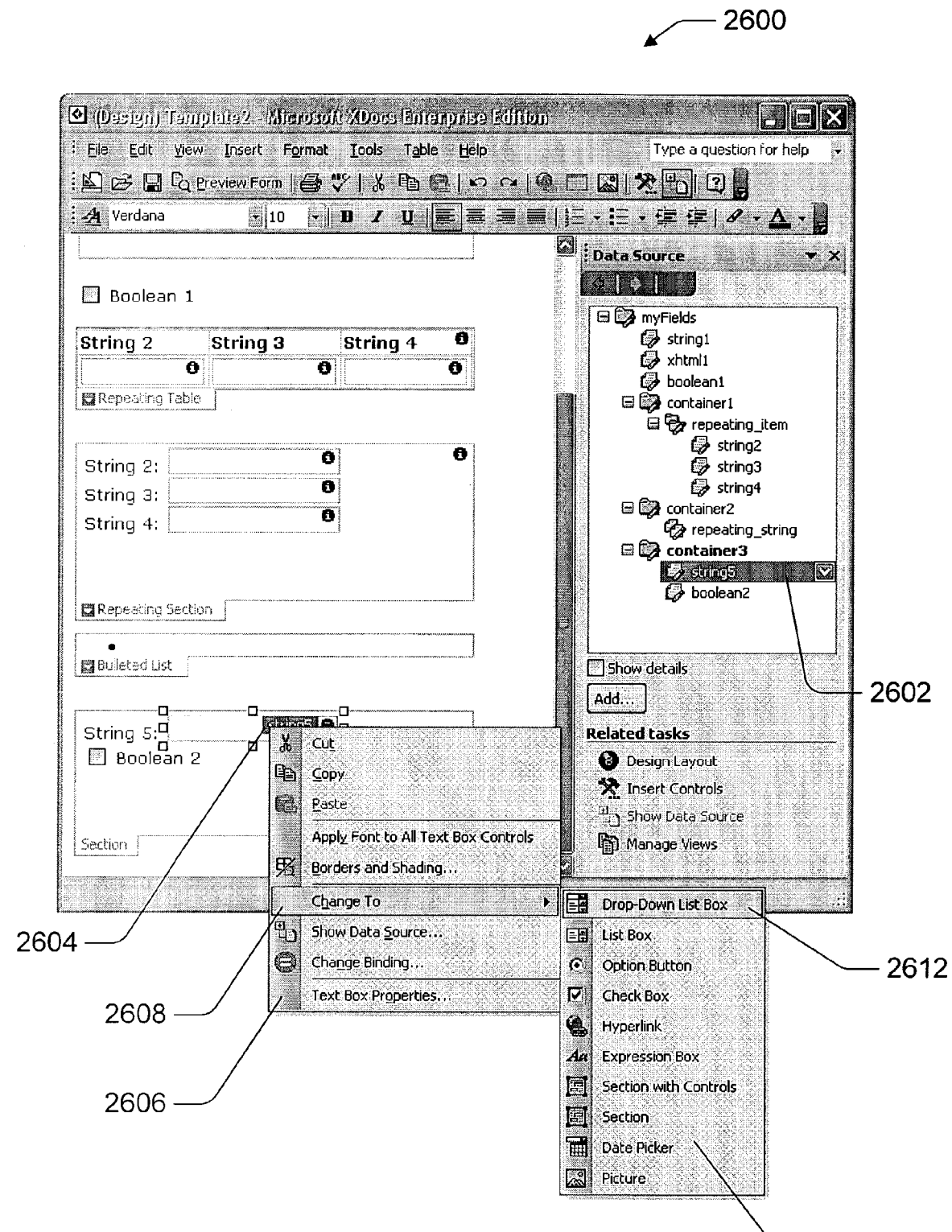
Figure 27:
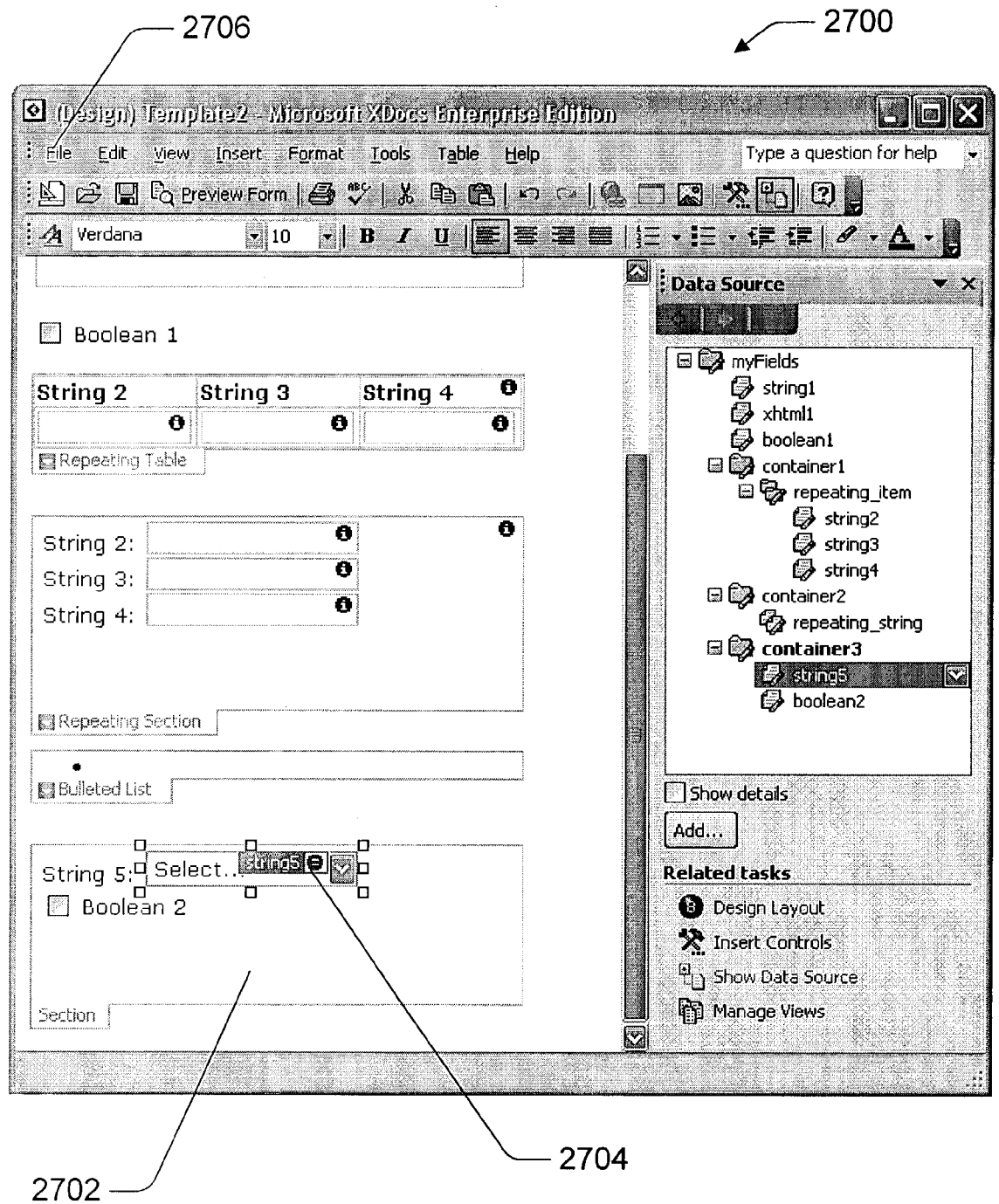

FIG. 26 shows that the string5 node 2602 has been selected by the user's input. FIG. 26 also shows that the suggestion mechanism of the data services sniffer 306 can operate on components. The user has selected the Text Box shape that was automatically inserted in field 2508 of FIG. 25 for the string5 node 2504 (seen at reference numeral 2604 in FIG. 26) such that a context menu 2606 is shown in FIG. 26. The context menu 2606 shows a "Change To" option 2608 which shows another menu 2610 which lists alternative suggestions for components to which the string5 node 2604 can be bound. In response, the user inputs the selection of the Drop-Down List 2612 as a component from the component suggestions menu 2610. The result of the user's input is the insertion of field 2704 onto the editing surface as shown in FIG. 27 at operative field 2702. Field 2704 has a drop down list component that is bound to the string5 node 2504.

The user can input an option from the "File" menu selection 2706 to save the "myfields" Data Source as an XML form template. This template can then be used to input data into the fields of the user interface seen in FIG. 27. The data that is input into the template can then be saved in an XML file having a schema defined by the suggested components that were selected by the user during the creation of the XML form template.

Techniques for Creating Electronic Forms

Various implementations of a form-designing process are set forth below. The form designing process can begin with a generalized instance and electronic form creation process 2800 seen in FIG. 28, and can include a process 2900 seen in FIG. 29 for rendering transformation-language components and generating a transformation-language document from an annotated rendering-language document.

Creating a Generalized Instance

Figure 28:
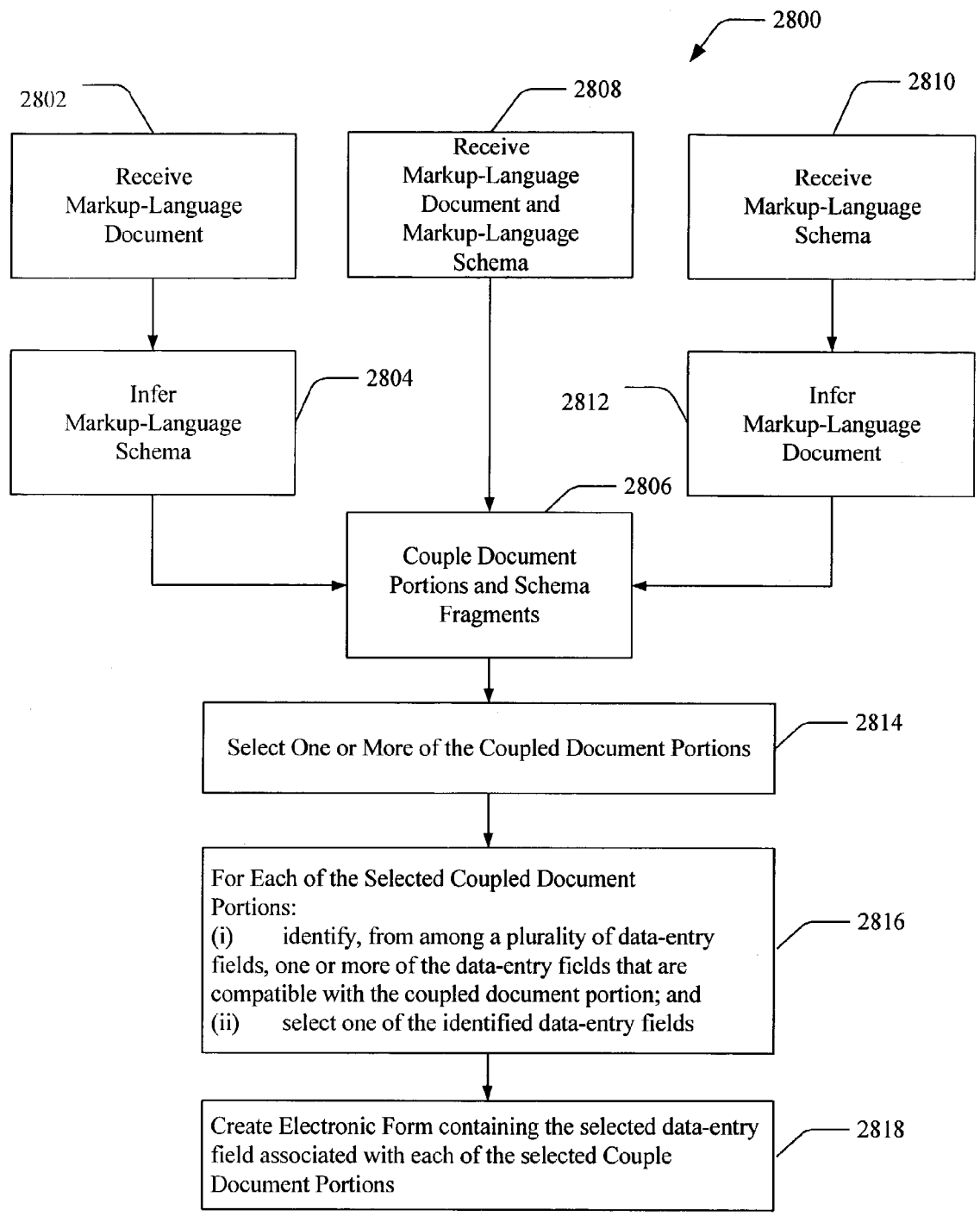
FIG. 28 is a flow diagram of an exemplary process for coupling a markup-language document and schema to create an electronic form.

FIG. 28 sets forth a process 2800 for creating a generalized instance from one or both of a markup-language document and a markup-language schema. A generalized instance contains hierarchical data. The process 2800 is illustrated as a series of blocks representing individual operations or acts performed by the system 100. The process 2800 may be implemented in any suitable hardware, software, firmware, or combination thereof. In the case of software and firmware, the process 2800 represents a set of operations implemented as computer-executable instructions stored in memory and executable by one or more processors.

Three ways to create a generalized instance are set forth in process 2800. In the first, the system 100 receives only a markup-language document. In the second, the system 100 receives both a markup-language document and its markup-language schema. In the third, the system 100 receives only a markup-language schema.

In the first way, the system 100 creates a generalized instance from only a markup-language document. The system 100 does so following blocks 2802, 2804, and 2806 of FIG. 28.

In the block 2802, the system 100 receives a markup-language document without its associated schema. The markup-language document received is a document containing hierarchical data that conforms to a markup-language schema, but the markup-language schema is not known. To determine or fabricate a schema for the markup-language document, the system 100 analyzes the structure in which the markup-language document conforms and/or investigates clues or references in the markup-language document.

With this information, the system 100 infers a markup-language schema according to the block 2804. The system 100 can infer the markup-language schema by building it based on the structure of the markup-language document. The system 100 can also infer the markup-language schema by searching sources containing schemas until it finds a schema matching the structure of or reference in the markup-language document. The World Wide Web Consortium ("W3C") is a source for the language used to describe some markup-language schemas.

In block 2806, the system 100 couples the markup-language document and its associated markup-language schema. Either of the markup-language document or markup-language schema may have been inferred. The generalized instance contains a hierarchical arrangement of data with each part of the hierarchical data also containing or referencing each part of the schema that governs that part of the hierarchical data. In one implementation, the system 100 couples the markup-language document and its schema modularly. The system 100 analyzes the structure of the markup-language document and the structure allowed by its schema to determine how the markup-language document can be modularized. The system 100 breaks the markup-language document into parts (referred to sometimes as "nodes" when the generalized instance is arranged as a tree). Based on each of these parts of the markup-language document, the system 100 associates pieces of the schema that govern the structure of a particular part to that particular part. By so doing, the markup-language document and its schema can be broken down into parts. These modular parts each contain a part of the markup-language document and a part of the markup-language schema governing that part.

These parts are then arranged into a generalized instance. The generalized instance contains an arrangement of parts, each part containing a piece of the markup-language document and piece of the markup-language schema governing that piece of the markup-language document.

For example, in FIG. 7, a "container3" node 740 is a part of a larger markup-language document (entitled "My Fields") associated with a markup-language schema. The "container3" node 740 contains information on its own and the information of a "string5" node 742 and a "boolean2" node 744. The "container3" node 740 also, if it is part of a generalized instance, contains the part of the schema associated with the markup-language document that governs the container3 node 740, the string5 node 742, and the boolean2 node 744. Thus, that part of the markup-language document that is called the container3 node 740 is modular by virtue of being coupled with the schema governing it. So each part of a markup-language document that is coupled with its markup-language schema is independent and modular. The generalized instance is a compilation of all the coupled parts.

One of the benefits of creating a generalized instance is that the system 100, when it receives a selection of one part of hierarchical data that is modularized into a generalized instance, can more easily associate that selected part to one or more components. The system 100, with just the selected part, can determine what rules govern that part, such as the type of information the part can contain, how it is arranged, how it can be used, and the like. Thus, the system 100 can more easily (and in some cases more accurately) suggest one or more particular components with the selected part of the hierarchical data when it is modularized into a generalized instance.

In one implementation, a generalized instance describes, for each part of a hierarchical data file, every possible type of information that can, be contained within that part. With this information, the system 100 can more match up and suggest which components can be validly associated with a selected part of hierarchical data that has been coupled or modularized into a generalized instance.

In the second way to create a generalized instance, the system 100 creates a generalized instance from a markup-language document and its markup-language schema. The system 100 does so following blocks 2808 and 2806 of FIG. 28.

In the block 2808, the system 100 receives a markup-language document and its associated schema. The markup-language schema describes the rules and/or structure governing the markup-language document received but can also govern other markup-language documents as well. With the markup-language document and its schema, the system 100 creates a generalized instance as set forth with respect to block 2806, above.

In the third way, the system 100 creates a generalized instance from only a markup-language schema. The system 100 does so following blocks 2810, 2812, and 2806 of FIG. 28. In the block 2810, the system 100 receives a markup-language schema without a conforming markup-language document. This markup-language schema can be one of many different types, including a schema not conforming to a W3C standard or one having an arbitrary syntax.

The system 100, through the forms designer application 126, analyzes the markup-language schema to determine the range of markup-language documents that can conform to the markup-language schema (block 2812). One of the powerful aspects of the forms designer application 126 is that it can determine this range of documents even when the markup-language schema defines an arbitrary syntax or does not conform to a known standard. This ability enables the forms designer application 126 to create generalized instances for these schemas. With these generalized instances, it can build electronic forms for use with data files having non-standard or arbitrary structures.

With the range of markup-language documents that can conform to the markup-language schema, the system 100 infers a markup-language document that conforms to the markup-language schema. With the markup-language document and its schema, the system 100 creates a generalized instance as set forth in block 2806, above.

After block 2806 process 2800 moves to block 2814 where one or more of the coupled document portions are selected. Then, block 2816 repeats for each of the selected coupled document portions, including identifying, from among a plurality of data-entry fields, one or more suggested data-entry fields that are compatible with the selected coupled document portion. Then, one selected data-entry field is selected, such as by a designer of an electronic form by use of a user interface.

After block 2816 is repeated for each of the selected coupled document portions, block 2818 allows for the creation of an electronic form. The electronic form is created at block 2818 such that it contains each of the selected, suggested data-entry fields that were associated with a corresponding selected coupled document portions.

Rendering-Language and Transformation-Language Documents

Figure 29:
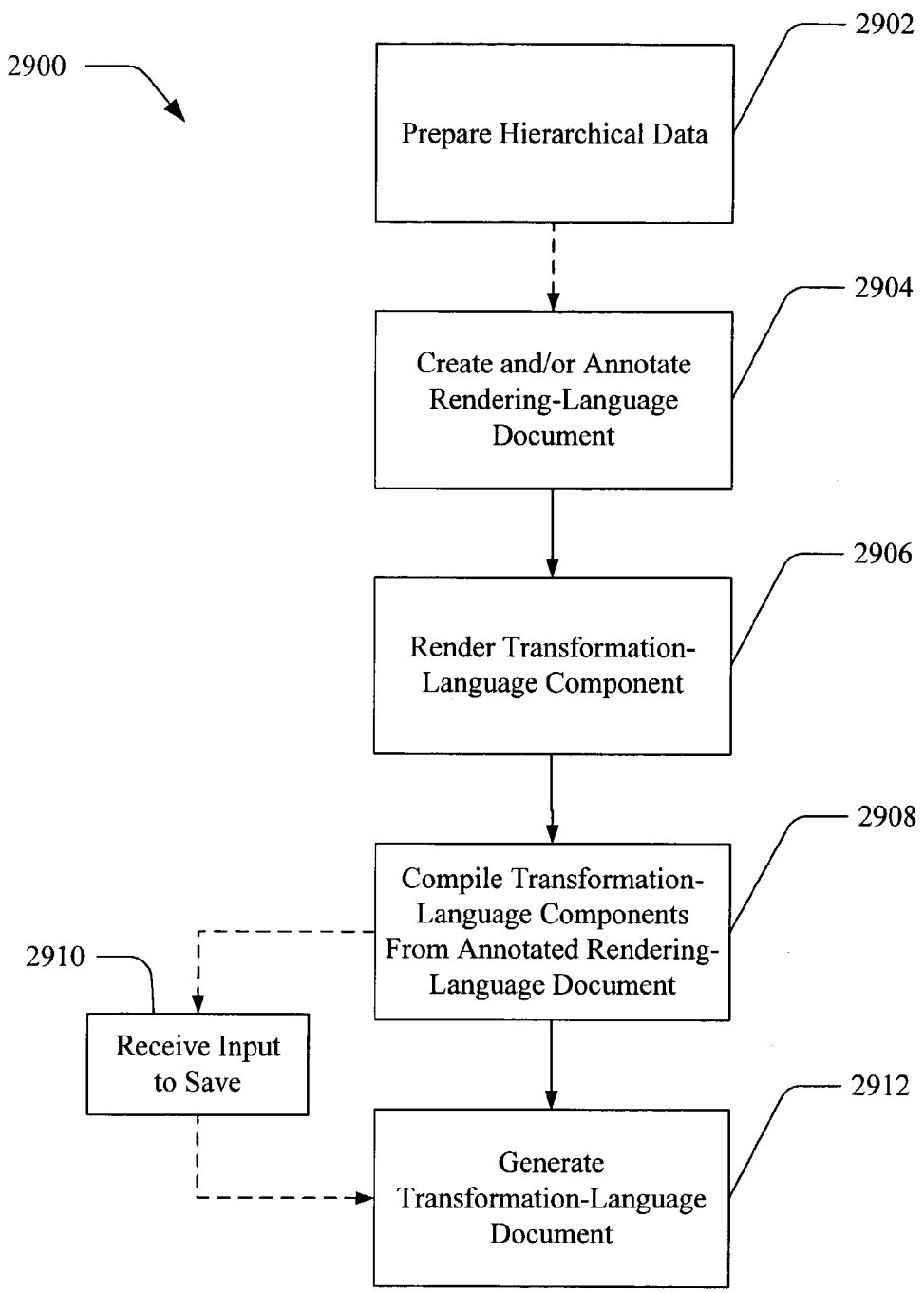
FIG. 29 is a flow diagram of an exemplary process for rendering transformation-language components and generating a transformation-language document.

FIG. 29 sets forth a process 2900 for rendering of transformation-language components and generating a transformation-language document.

The process 2900 is illustrated as a series of blocks representing individual operations or acts performed by the system 100. The process 2900 may be implemented in any suitable hardware, software, firmware, or combination thereof. In the case of software and firmware, the process 2900 represents a set of operations implemented as computer-executable instructions stored in memory and executable by one or more processors.

The process 2900 begins with a block 2902, where the system 100 prepares hierarchical data into a generalized instance, such as has been set forth above in the description of the process 2800 in FIG. 28. The process 2900 can start with a generalized instance through block 2902 or otherwise, so long as the hierarchical data is displayed.

In the following description of the process 2900, hierarchical data is sometimes referred to as a markup-language document and components as transformation-language components. It is to be understood that these terms are used to aid in the clear exposition of the process 2900, and are not in any way limiting of the process 2900.

Creating and Annotating a Rendering-Language Document

In block 2904, the system 100 creates and/or annotates a rendering-language document. A rendering-language document is a document or file that, when executed (alone or in conjunction with other files or applications) displays a view on a screen. One example is a file that displays a webpage. This type of file gives a reader a view of information, such as through text, graphics, and the like. A rendering-language document is not the same thing as an electronic form, but rather is a view of what an electronic form can look like. Thus, a rendering-language document can create views seen in the form-design area 112.

As part of the block 2904, the system 100 creates a rendering-language document by applying one or more components on a corresponding one or more parts of hierarchical data. Each of the components that are applied, as described above, can be identified from among a plurality of components. The process for identifying components is a matching process that compares the compatibility of a part of the hierarchical data with the plurality of components. When a match is found, the identified component is offered as a possible selection to a forms designer. If the matching component is selected by the forms designer, a visual representation of the selected component will be depicted in a form design area of a display screen.

In the following description, the components that are suggested for selection by a forms designer are written in a transformation-language and the hierarchical data includes a markup-language document.

Rendering-language documents can be written in HTML, XHTML, other machine languages, or other languages that are adept at viewing or displaying. To create rendering-language documents written in XHTML, the system 100 applies one or more XSLT transformation-language components on one or more nodes or portions of an XML document. Once the system 100 creates a rendering-language document, the system 100 can annotate the rendering-language document to make it easier to create an electronic form from the rendering-language document.

These annotations include two primary types. One annotation indicates the type of suggested transformation-language components that was selected. Another annotation indicates the node of the tree of hierarchical data selected (or part of the hierarchical data). The placement chosen for each selected suggested component on the form-design area 112 can be part of the rendering-language document, but is not generally considered an annotation. Thus, the product to this point is an annotated rendering-language document (such as an XHTML document) that can render (shows a view of) the selected suggested transformation-language component (such as an XSLT component) on the form-design area 112 (such as is set forth in FIG. 2). Annotating the rendering-language document by adding this information enriches the rendering-language document so that it contains information for the system 100 to later analyze the rendering-language document to help create an electronic form. The system 100 can, for example, identify the annotations in an annotated rendering-language document to create an electronic form visually mimicking the view created by the annotated rendering-language document. Thus, in this example, the system 100 can create an electronic form mimicking the view of the transformation-language components set forth and manipulated by a designer in the form-design area 112 (such as set forth in FIG. 2). With the electronic form a user can enter information into fields of the electronic form that can be retained by a file. The file, in some cases, mimics the structure of the hierarchical data file from which the electronic form was created, such as an XML document.

Rendering Transformation-Language Components with a Rendering-Language Document

Once this rendering-language document is created and/or annotated, it can be used by the system 100 to render transformation-language components, as set forth in a block 2906. Typically, the system 100 renders the transformation-language components on a display, such as the form-design area 112 of the screen 102 of FIG. 1.

Based on the structure of the rendering-language document, the system 100 can render transformation-language components in various ways. For example, the system 100 can render the text box 802 of FIG. 8 (which is a component) to look like the box set forth in FIG. 9 as the text box representation 902 labeled "String1".

In FIG. 2, for instance, the system 100 renders transformation-language components with a rendering-language document to create the view set forth in the form-design area 112, which mimics how the electronic form will appear.

Thus, using XSLT transformation-language components, XML hierarchical data, and XHTML rendering-language documents as examples, once the system 100 receives from a designer a selection and placement of one of a list of suggested XSLT transformation-language components that can be validly associated with a selected node of the XML document, such as by the designer clicking on the XSLT transformation-language component's icon or text and dragging the icon or text over to the form-design area 112, the system 100 renders the transformation-language component.

To do so, the system 100 applies the selected XSLT transformation-language component to the XML hierarchical data represented by the selected node or portion. By so doing, the system 100 creates an XHTML document that renders a visual representation of the suggested XSLT transformation-language component on the form-design area 112 at the place the designer selected.

Compiling Transformation-Language Components into a Transformation-Language Document In block 2908, the system 100 then determines, from the annotated rendering-language document, the transformation-language components used and the location of the nodes in the markup-language document that are associated with each transformation-language component rendered. In block 2912, the system generates a transformation-language document from this information (as well as the information regarding the placement, style, and formatting of transformation-language components included within the rendering-language document), either after or independent of a designer saving the form-design screen 112 (block 2910).

The transformation-language document is the document ultimately created and saved by the system 100, while the rendering-language document is no longer needed. This is because the transformation-language document can create a view of hierarchical data mimicking the view created by the rendering-language document that was used to create the transformation-language document. The transformation-language document, when applied to a markup-language document having the same schema as the one from which the parts were chosen by the designer, will create an electronic form visually mimicking the rendering made by the rendering-language document. The electronic form created, however, can contain fields that can be populated by information from a user or from another markup-language document.

The electronic form created can be used by a user to key in information into fields, such as the purpose of an appointment (see the form-design area 112 of FIG. 2). The electronic form created can also have its fields populated by other hierarchical data files, thereby reducing the labor needed to key-in information by hand. One way in which an electronic form can be created with one or more fields already populated is by applying a transformation-language document to a markup-language data file containing information. The result can be an electronic form with the fields filled where nodes of a markup-language data file correspond to those fields that contain information.

Thus, a designer not knowledgeable about transformation-language documents or programming can, in an easy-to-use way, create an electronic form from a markup-language document. This electronic form also can be flexibly created, allowing a designer to choose from among various system-suggested transformation-language components, change the orientation and placement of the transformation-language components, change the font, color, size, and make other word-processor-like changes to the transformation-language components, so that the electronic form will have the structure and look intended by the designer.

The system 100 can even create XSLT transformation-language documents, which are especially complex. In this case, a designer having little knowledge about the XSLT language can create an XSLT transformation-language document using XSLT transformation-language components, XML hierarchical data, and an XHTML rendering-language document.

With respect to the screen shots of FIGS. 7–27, each field on the editing surface of the user interfaces can be characterized by a component that is described by a shape description language (SDL). The SDL describes each such field in terms of a package that contains three (3) aspects. The first aspect is that of shape and can include one or more shapes of data structures. The second aspect is metadata. The third aspect is that of a presentation schema (e.g. an XSLT fragment) of the one or more shapes in the package. In one implementation, a shape in the form of an XML component template can be constructed for the three aspects of each field. Each of these three aspects will now be discussed in order.

Each of one or more shapes in a package of a field can be defined by the SDL. Each shape can be associated with an optional priority. Valid shapes can be sorted and output in their sorted order for selection by a user corresponding to a user-selected node of a tree structure of a data source. Each shape is built by abstracting a schema, where the schema defines a data type and a data structure. The schema includes a layout of a tree structure that includes its nodes. Each node has a data name and a data type. The data type of the node can be visually represented in the form of a data structure or shape. The shape can be a plain text box, a drop-down list box, a list box, a check box, a rich text box, an expression box, an option button, a button, a section with controls, a section, an optional section, an optional section with controls, a repeating section with controls, a repeating section, controls in a layout table, controls, a repeating table, a bulleted list, a numbered list, a plain list, a hyperlink, a date picker, an inline picture, or a linked picture.

The data name and the data type for each node are metadata for the second aspect of the package of a field on the electronic form. The metadata is for display on an editing surface of a user interface. The data name for each selected node on the tree structure can be parsed by a parsing routine to form a named description for displaying on an editing surface. When a view generation transform step is performed, the name of the selected tree node can be incorporated into the output view description on the editing surface of the user interface. With the addition of simple string-transformation heuristics, the data name for the selected node can be transformed into an easy to read and understand label which is inserted into the view on the editing surface. As such, the electronic form can be self-documenting. For example, when the user selects a node in a tree structure that has the node name "firstName", a parsing routine can form the label "First Name:" which in turn can be inserted into the view at a location preceding an input area in the field to which the selected node is bound.

The shape can be defined in the SDL in various ways. The shape can define a data structure that has neither a data type nor data name. Alternatively, the shape can define a data structure that has both a data type and a data name. The shape can be defined to be different than the corresponding schema for a selected node on a tree structure of a data source. The shape can be limited to defining only a data type. The shape can be a container that includes a plurality of items. The shape can define a repeating structure, such as a table. The shape can define a data structure that is a container that contains a plurality of repeating items, where each of the repeating items includes a plurality of data strings. The shape can be defined so as to permit more data types and data structures than a corresponding schema with respect to a selected node on a tree structure of a data source. As such, the concept of shape is more relaxed than that of the schema. As describe above, the shape is selected by user input from among a list of valid components that were suggested by the data services sniffer 306 that performs a validation and/or comparison routine. The data services sniffer 306 will preferably be limited to suggesting shapes (e.g., components) for a selected node on a tree structure of a data source that are valid as per a corresponding schema and any annotation thereof.

The presentation schema is the third aspect of the package of the SDL that describes a field. In essence, the presentation schema is a renderable language for a visual presentation of the field. The presentation schema can be an instruction set for a transform of a selected node within a portion of an XML data structure into a corresponding portion of a view in a presentation. The instruction set can be an XSLT fragment that is used to transform a selected node of an XML structure into a portion of the view. The XSLT fragment can define a transform from an XML input to an XHTML output that is used to create the visual representation of the field on the form. The description of the transform can use a standardized XML-based syntax.

The XSLT fragment, which is essentially a transform language from one XML definition to another, can be an aspect of an XML component template that references other XML component templates by a unique identifier. As such, the visual presentation logic inherent in a first XML component template can be re-used in the referenced XML component templates. The XSLT fragment of an XML component template can be used by the data services sniffer for both the selected XML node and its sub-nodes to suggest shapes for both the node and its sub-nodes.

The presentation schema need not be XML based but rather can be based upon a simply static output of one or more pre-defined view fragments with no dependence on the selected node, or it can be based upon a description of a transform in a procedural language, such as where the procedural language is a script fragment.

The metadata of the package of the SDL can include the name of the XML component template as well as a graphical representation for display of the XML component template on an editing surface. The editing surface is displayed in the course of executing an application that forms an XML form template. The XML form template includes one or more of the XML component templates. Each XML component template represents one field on the XML form template.

Implementations disclosed herein allow a user to interactively select XML template components that represent fields on an electronic form as it is being created. The XML template components are interactively selected for a plurality of hierarchically arranged nodes of an XML data structure. The nodes are within a tree view on a tree structure, where each node can define an XML instance. As described above, when the user selects a node within the tree view, the user is presented with a prioritized list of suggested component (e.g. one or more data structures in a list) as determined by the data services sniffer 306. The suggested components will preferably contain at least one match for every node that the user interactively selects. The suggested component list is provided by a data services sniffer 306 and will preferably show the components in order of priority by a weighting of the matches that were identified by the data services sniffer 306. A match is a recognized valid component for a node in the tree structure given its schema. The matching operation identifies each matching component. The matching components are prioritized on the basis of the schema for the selected node. The components are displayed, in priority order, on a component suggestion menu. The user interacts with the component suggestion menu to select one component. The component suggestion menu can also show additional information to provide understanding about the tree structure by the use of visual cues (i.e. icons, such as a table icon for repeating data types that have a fixed number of elements).

The user can select a component from the component suggestion menu using one or more user interface gestures (e.g. a mouse click and a key pressed). The user can also dismiss the component suggestion menu without selecting a component.

In one implementation, the data services sniffer 306 can generate the component suggestion menu by comparing the tree structure and the data types of the selected node and any sub-nodes under the selected node against every component within every XML template component known to the forms designer application 126. If a particular component matches the selected node and its sub-nodes given their respective schema, the shape is added to the component suggestion menu. The component suggestions for the sub-nodes can be automatically selected according the data services sniffer

306's assigned highest priority. Preferably, the suggestions are selected by user interaction that is provided by a dialog box or other UI element that will allow the user to select a choice for each node and sub-node thereof in a recursive application so that many fields can be inserted into an electronic form as it is being created.

When an XML component template is selected by a user and a corresponding visual representation is inserted as a field on to the editing surface of the user interface, the properties of the XML component template determine the attributes of the schema part that is added to the electronic form. For example a date picker control will add a schema part whose data type is "date." A list control will add a schema part whose cardinality allows instances of that schema part to repeat. Components that can contain other components (e.g. "container controls") will add schema parts which can contain other schema parts (e.g. "groups"). By way of example, TABLE 2 shows various components that create associated XML schema definitions. In TABLE 2, each Control Name has its own counter, indicated by the "#" symbol.

TABLE 2

| Control name | XSD Construct (i.e., properties for schema part) |
|---|---|
| Text Box | \<element name="field#" type="string"/\> |
| Rich Text Box | \<element name="field#"\> \<complexType mixed="true"\> \<sequence\> \<any minOccurs="0" maxOccurs="unbounded" namespace="http://www.w3.org/1999/xhtml" processContents="lax" /\> \</sequence\> \</complexType\> \</element\> |
| Check Box | \<element name="field#" type="boolean"/\> |
| List Box | \<element name="field#" type="string"/\> |
| Drop-Down List Box | \<element name="field#" type="string"/\> |
| Option Button | \<element name="field#" type="string"/\> |
| Date Picker | \<element name="field#" type="date"/\> |
| Picture (linked) | \<element name="field#" type="anyURI"/\> |
| Picture (inline) | \<element name="field#" type="base64Binary"/\> |
| List (plain, numbered, or bulleted) | \<element name="group#"\> \<complexType\> \<sequence\> \<element name="field#" type"string" maxOccurs="unbounded"/\> \</sequence\> \</complexType\> \</element\> |
| Section, Optional Section | \<element name="group#"\> \<complexType\> \<!--EMPTY CONTAINER --\> \</complexType\> \</element\> |
| Repeating Section | \<element name="structuredDataList#"\> \<complexType\> \<sequence\> \<element name="structuredData#" maxOccurs="unbounded"\> \<complexType\> \<!--EMPTY CONTAINER --\> \</complexType\> \</element\> \</sequence\> \</complexType\> \</element\> |
| Repeating Table | \<element name="group#"\> \<complexType\> \<element name="group#" maxOccurs="unbounded"\> \<complexType\> \<sequence\> \<element name="field#" type="string"/\> \<element name="field#" type="string"/\> \<element name="field#" type="string"/\> \<!--Etc. for each column --\> \</sequence\> \</complexType\> \</element\> \</complexType\> \</element\> Note: The number of columns will determine the number of "field#"s added. |
| Button, Expression Box, Hyperlink | None |

In another implementation, some of the component names in TABLE 2 can use the enumeration restriction instead of simply using a string. These control names include List Box, Drop-Down List-Box, and Option Button.

With respect to the prioritization of components presented in the component suggestion menu, the priority can be derived from two sources. The first source is a weighting as to the degree of the specificity of the match according to a matching algorithm used for comparing the component to the node of the tree structure. The second source can be a priority associated with each component within each XML component template. For example, a "Check Box" component specifies the exact component requirement "Boolean" (which describes a node which must contain "true" or "false") with priority 50, while a "Text Box" component specifies the loose component requirement "any" (any leaf node) with priority 10. Thus, when testing components against a node that is specified by its XML data structure to have a boolean data type, the data services sniffer 306 will assign the "Check Box" component a higher priority than the data services sniffer 306 will assign to the "Text Box" component. However, a third component "List Box" also specifies an exact requirement for a "Boolean" data type, but with priority 20. To resolve the ambiguity, the priorities associated with each component's matching attributes (e.g., data structure and/or data type) are compared. In this case, the "Check Box" component's match for the "boolean" data type has the higher priority value of 50, so the data services sniffer 306 will present the "Check Box" component at the top of the list of suggested components.

The forms designer application 126 can change its component suggestion logic based on selections within the view (in addition to selections within the data structure). Elements comprising the view may create "contexts" within which the interpretation of components differs. For example, a portion of the view may be described as a "repeating section" and be identified with a repeating structure in the data. If the user selects a node in the data structure which is a child of the repeating structure while the associated repeating section is identified in the view, non-repeating components may be suggested by the data services sniffer 306, whereas if the repeating section is not selected, components may be suggested which include the repeating section to ensure that all instances of the node within its repeating context are associated with the view.

For the tree representation of the XML data structure, the forms designer application 126 can permit the user to select multiple nodes before making suggestions as to components using the data services sniffer. XML component templates can be created so that they will accept multiple nodes with XSLT transforms that provide appropriate view representations. For example, when multiple nodes are selected, the XML component template can be a recursive application to present the same components that would be suggested for each node independently, but with a more visually appealing layout (e.g. multiple columns and an overall visual alignment of multiple fields).

In the forms designer application 126, within XML component templates, certain components may be marked as being "defaults". When components are suggested for a node in the tree representation of the XML data structure, any XML component templates which are suggested as a result of a match with a "default" component (e.g. a default XML component template) may be presented in an alternate manner. For example, the suggested default XML component templates may be visually separated from the other suggested XML component templates by a visual indicator (a separator line).

The component list in the component suggestion menu may be presented as a popup menu when the user clicks on the representation of a node in the visual tree. The component list in the component suggestion menu may also be presented in a dialog window when the user clicks on the representation of a node in the tree representation of the XML data structure (the tree structure). A predetermined number of components in the component list in the component suggestion menu may be followed by a popup menu option to display additional suggestions so as to display an exhaustive list of components within a dialog window.

An application can be configured such that a "best match" XML component template can be automatically selected when the user clicks on the representation of a node in the tree structure. As such, no choices would be shown to the user unless some modification of the action is performed (e.g. right-click, or holding down the Shift or Control key while clicking). When the modified action is performed, any of the above component selection mechanisms may be used.

The forms designer application 126 may apply the following rules: (1) if the component list in the component suggestion menu contains more than one "default suggestion", a list of only the default suggestions is shown using a popup menu or a dialog; (2) if the component list in the component suggestion menu contains only one "default" suggestion, it is selected automatically by the forms designer application 126; (3) if the component list in the component suggestion menu contains no "default" suggestions, the "best match" is selected automatically by the forms designer application 126.

"Dragging" a node in the tree structure and "dropping" the node on to the editing surface causes there to be a specification of both the node and a locus on the editing surface at which the insertion operation should take place. After the "drag and drop" is performed, any of the above component selection mechanisms outlined above may be used to edit the component of the inserted field.

A combination of "modified actions" and "drag and drop" may be used. For example, an unmodified drag and drop can be configured to result in a list of default components or an automatic component suggestion, while a drag and drop modified by using the right mouse button can be configured to result in a list of the top ten component suggestions plus a "More . . . " choice which displays the complete list of all valid components for a selected node.

The forms designer application 126 can be configured to include a mechanism that allows interactive modification of fields that have been inserted into the edited surface. After a user has selected a suggested component for a selected node in a tree structure, but before an XSLT transform associated with the XML component template has created a view of the XML fragment, the user may be presented with additional choices which act as input into the XSLT transform process. For example, consider the following XML fragment:

```
<inventory>
    <row sku="1001"  desc="baseball glove"   price="50.00" quantityInStock="500" />
    <row sku="1002"  desc="batting helmet"   price="25.00" quantityInStock="0" />
    <row sku="1003"  desc="baseball bat"     price="40.00" quantityInStock="100" />
</inventory>
```

When the user selects the "inventory" node from a tree structure, an application may suggest a "table" component which would show data within the "inventory" sub-tree in a tabular structure of rows and columns. After the user has made this selection, additional user interface components (dialogs, menus, etc.) may be shown to refine the component before it is inserted as a field on the editing surface. For example, the user may be given a choice of what data columns to include in the table, how the data should be sorted or filtered, or how different types of data should be presented. These user choices act as input into the XSLT transform and are exposed as variables which the XSLT fragment of the XML component template can use to construct the view (the XSLT output) which is then injected into the editing surface.

XML component templates for each field in an electronic form can be added to the forms designer application 126 in various ways. For instance, an XML component template can be offered when a view is first authored as a "sample" for customization. An XML component template can be offered by customizing when a view is being modified by the forms designer application 126. For example, a general "expense report" view may include a "justification" component which may be added to the forms designer application 126's collection (and therefore suggested by the data services sniffer 306) only when that view is being modified by the forms designer application 126. In another example, an XML component template can be derived from access to files that describe XML component templates in a filesystem directory that the data services sniffer 306 is directed to when component suggestion lists are being generated. The forms designer application 126 can also be configured to contact an online service that provides additional XML component templates for download. The forms designer application 126 can also allow users to create new XML Component Templates. By way of example, a business card XML Component Template (e.g. a mini-form) can be created by a user interacting with the forms designer application 126 through the user interface. The forms designer application 126, in turn, produces an XML selection and a shape definition (e.g., as defined in a Shape Definition Language—SDL) for the business card XML Component Template, an example of which is as follows:

---
XML Data Selection:
---

```
<businessCard
xmlns="http://www.schemasRus.org/personal/businesscard">
    <name>Buford</name>
    <middleInintial>T</middleInitial>
    <familyName>Justice</familyName>
    <title>County Sheriff</title>
    . . .
</businessCard>
```

---
Shape and Shape Definition Language (SDL):
---

```
"<xsd:schema  xmlns:xsd="http://www.w3.org/2001/XMLSchema"
xmlns="http://www.schemasRus.org/personal/businesscard"
targetNamespace=="http://www.schemasRus.org/personal/businesscard">
    <xsd:element name="businessCard">
        <xsd:complexType>
            <xsd:sequence>
                <xsd:element name="name" type="xsd:string"/>
                <xsd:element name="middleInitial" type="xsd:string" minOccurs="0" masOccurs="1" />
                <xsd:element  name="familyName" type="xsd:string"/>
                <xsd:element name="title" type="xsd:string"/>
                . . .
            </xsd:sequence>
        </xsd:complexType>
    </xsd:element>
<xsd:schema>"
```

A node in a tree structure can be assigned to an alternate visual representation. Once a user has a visual representation of a node in the view ("view component"), the data services sniffer 306 can be used to suggest alternate visual representations for the same node. This may be implemented as a choice on a context or "right-click" menu on a view component. When the context menu for a view component is shown, the same list of component suggestions for the node is presented as if the node were selected directly. When the user selects a new component, the current view of the component is deleted and the insertion process (e.g. a "convert" process) for the new component begins. Additional visual user interface elements may be shown to enable this scenario. For example, after a view of the component has been inserted as a field onto the editing surface, a visual indicator may be placed near the field ("on-object user interface", or OOUI). When the user's mouse cursor moves over the visual indicator, the list of components suggestions is shown. This allows the user to easily replace the component of the field with alternative choices. For example, if the forms designer application 126 automatically selects the highest priority component for the field, the user may replace the component of the field with a more appropriate component.

Just as changes can be made to which component a field is associated with, so also can changes can be made to which node a field is associated with. A change in the node for a field can be implemented as a command on a context menu. When the user selects this command, a list of possible nodes can be presented to the user, and the user may select a new node from the list. A validation routine can be used to validate that the selected node is an appropriate choice for the view component by the following rule: if the component which produced the selected view component would have been suggested for the selected node according to predetermined criteria, the selected node is considered to be a "valid" node for the field.

The result of the electronic form creation in the forms designer application 126 can be an XSLT transformation that enables the editing of XML data structures that come from that particular class that the electronic form has been designed for. When saving an electronic form created with the forms designer application 126 as an application form template, the XSLT instruction set in the XML component template for each field in the electronic form is executed to do a transform on the corresponding XML data. For example, table names can be added for columns, a header row can be added, margins and borders that match the rest of the document can be added, and a new instruction set (e.g. XSLT) can be produce and inserted into the XML template form when the electronic form is saved.

A Computer System

Figure 30:
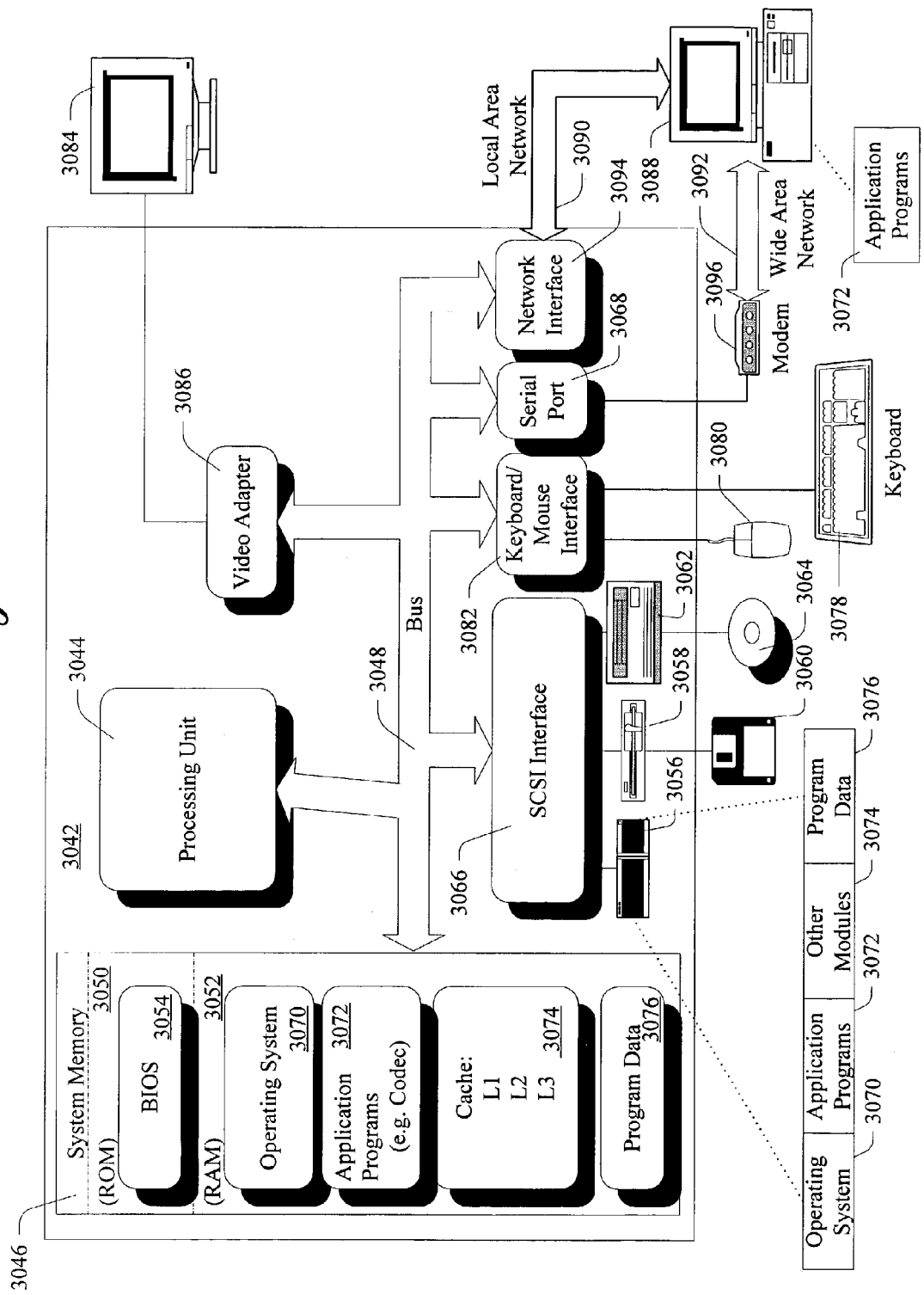
FIG. 30 is a block diagram, in accordance with an implementation, of a networked computer that can be used to implement either a server or a client.

FIG. 30 shows an exemplary computer system that can be used to implement the processes described herein. Computer 3042 includes one or more processors or processing units 3044, a system memory 3046, and a bus 3048 that couples various system components including the system memory 3046 to processors 3044. The bus 3048 represents one or more of any of several types of bus structures, including a memory bus or memory controller, a peripheral bus, an accelerated graphics port, and a processor or local bus using any of a variety of bus architectures. The system memory 3046 includes read only memory (ROM) 3050 and random access memory (RAM) 3052. A basic input/output system (BIOS) 3054, containing the basic routines that help to transfer information between elements within computer 3042, such as during start-up, is stored in ROM 3050.

Computer 3042 further includes a hard disk drive 3056 for reading from and writing to a hard disk (not shown), a magnetic disk drive 3058 for reading from and writing to a removable magnetic disk 3060, and an optical disk drive 3062 for reading from or writing to a removable optical disk 3064 such as a CD ROM or other optical media. The hard disk drive 3056, magnetic disk drive 3058, and optical disk drive 3062 are connected to the bus 3048 by an SCSI interface 3066 or some other appropriate interface. The drives and their associated computer-readable media provide nonvolatile storage of computer-readable instructions, data structures, program modules and other data for computer 3042. Although the exemplary environment described herein employs a hard disk, a removable magnetic disk 3060 and a removable optical disk 3064, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 3056, magnetic disk 3060, optical disk 3064, ROM 3050, or RAM 3052, including an operating system 3070, one or more forms-designer application 3072, other program modules 3074, and program data 3076. A user may enter commands and information into computer 3042 through input devices such as a keyboard 3078 and a pointing device 3080. Other input devices (not shown) may include a microphone, joystick, game pad, satellite dish, scanner, or the like. These and other input devices are connected to the processing unit 3044 through an interface 3082 that is coupled to the bus 3048. A monitor 3084 or other type of display device is also connected to the bus 3048 via an interface, such as a video adapter 3086. In addition to the monitor, personal computers typically include other peripheral output devices (not shown) such as speakers and printers.

Computer 3042 commonly operates in a networked environment using logical connections to one or more remote computers, such as a remote computer 3088. The remote computer 3088 may be another personal computer, a server, a router, a network PC, a peer device or other common network node, and typically includes many or all of the elements described above relative to computer 3042. The logical connections depicted in FIG. 30 include a local area network (LAN) and a wide area network (WAN) 3094. Such networking environments are commonplace in offices, enterprise-wide computer networks, intranets, and the Internet.

When used in a LAN networking environment, computer 3042 is connected to the local network through a network interface or adapter 3096. When used in a WAN networking environment, computer 3042 typically includes a modem 3098 or other means for establishing communications over the wide area network 3094, such as the Internet. The modem 3098, which may be internal or external, is connected to the bus 3048 via a serial port interface 3068. In a networked environment, program modules depicted relative to the personal computer 3042, or portions thereof, may be stored in the remote memory storage device. It will be appreciated that the network connections shown are exemplary and other means of establishing a communications link between the computers may be used.

Generally, the data processors of computer 3042 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the blocks described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

The above description for generating electronic forms allows a designer to easily create electronic forms from a file of hierarchical data, even if the designer has only very basic skills. The designer is also allowed to create, from suggested components that are selected with the click of a mouse, XSLT files capable of transforming XML documents into XHTML files simply by clicking on parts of an XML document and/or its schema.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   displaying a tree arrangement of hierarchical data having at least one node;
   receiving input selecting an individual node; and,
   responsive to receiving input, generating a corresponding component suggestion menu that offers a plurality of components as options for representing the node, wherein the component suggestion menu presents individual components in a prioritized manner based upon at least two different sources, wherein a first source is based upon user selections in instances where the node was previously represented and a second source which compares components based upon how well an individual component's data type satisfies the node.

2. A method comprising:
   generating a hierarchical data display area having at least one node;
   generating a form-designing area to be displayed concurrently with the hierarchical data display area;
   receiving input selecting an individual node; and,
   responsive to receiving input regarding the individual node, suggesting individual components which represent a way to present the individual node on the form-designing area, wherein the suggesting comprises presenting the suggested components in a prioritized manner based at least in part upon user selections in instances where the node was previously represented.

3. A computer-readable medium storing computer-executable instructions that, when executed by a computing device, perform acts comprising:
   displaying a tree arrangement of hierarchical data having at least one node;
   receiving input selecting an individual node; and,
   responsive to receiving input, generating a corresponding component suggestion menu by comparing the tree arrangement and data types of the individual node and any sub-nodes under the individual node against available components, wherein the component suggestion menu presents individual components in a prioritized manner based upon at least two different sources, wherein the two different sources comprise a first source that is based upon user selections in instances where the node was previously represented and a second source which compares components based upon how well an individual component's data type satisfies the node.

4. A computer-readable medium storing computer-executable instructions that, when executed by a computing device, perform acts comprising:
   generating a hierarchical data display area having at least one node;
   generating a form-designing area to be displayed concurrently with the hierarchical data display area;
   receiving input selecting an individual node; and,
   responsive to receiving input regarding the individual node, suggesting individual components which represent a way to present the individual node on the form-designing area, wherein the suggesting presents the suggested components in a prioritized manner based upon how well an individual component's data type satisfies the node.

5. An apparatus comprising:

means for displaying a tree arrangement of hierarchical data having at least one node;

means for receiving input selecting an individual node; and, means for generating, responsive to receiving input, a corresponding component suggestion menu by comparing the tree arrangement and data types of the individual node and any sub-nodes under the individual node against available components, wherein the component suggestion menu presents individual components in a prioritized manner based upon at least two different sources, wherein the two different sources comprise a first source that is based upon user selections in instances where the node was previously represented and a second source which compares components based upon how well an individual component's data type satisfies the node.

6. An apparatus comprising:

means for generating a hierarchical data display area having at least one node;

means for generating a form-designing area to be displayed concurrently with the hierarchical data display area;

means for receiving input selecting an individual node; and, means for suggesting, responsive to receiving input selecting the individual node, individual components which represent a way to present the individual node on the form-designing area, wherein the suggesting comprises presenting the suggested components in a prioritized manner based at least in part upon user selections in instances where the node was previously represented takes into account the hierarchical data and data types of the individual node as well as previous user actions in the form designing area.

* * * * *